(12) United States Patent
Shin et al.

(10) Patent No.: US 12,166,912 B2
(45) Date of Patent: Dec. 10, 2024

(54) ELECTRONIC APPARATUS INCLUDING A LOWER MEMBER AND A SENSING SENSOR WITH OPENINGS OVERLAPPING A FOLDING AREA

(71) Applicant: Samsung Display Co., Ltd., Yongin-Si (KR)

(72) Inventors: Jaiku Shin, Hwaseong-si (KR); Sojeong La, Suwon-si (KR); Sung-Ki Jung, Asan-si (KR); Sung Chul Choi, Hwaseong-si (KR); Hyun-Been Hwang, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 159 days.

(21) Appl. No.: 17/380,680

(22) Filed: Jul. 20, 2021

(65) Prior Publication Data

US 2022/0086267 A1 Mar. 17, 2022

(30) Foreign Application Priority Data

Sep. 16, 2020 (KR) .................. 10-2020-0118820

(51) Int. Cl.
*H04M 1/02* (2006.01)
(52) U.S. Cl.
CPC .................. *H04M 1/0268* (2013.01)
(58) Field of Classification Search
CPC .... H04M 1/0268; H04M 1/02; H04M 1/0214; H04M 1/0216; G06F 3/041; G06F 3/0412; G06F 3/0414; G06F 3/04146; G06F 3/04144; G06F 2203/04102; G06F 2203/04103; G06F 2203/04104;
(Continued)

(56) References Cited

U.S. PATENT DOCUMENTS 10,310,644 B2 6/2019 Park
10,317,947 B2 6/2019 Park et al.
(Continued)

FOREIGN PATENT DOCUMENTS

KR 10-2016-0109964 9/2016
KR 10-2017-0043076 4/2017
(Continued)

*Primary Examiner* — Angelica Perez
(74) *Attorney, Agent, or Firm* — F. CHAU & ASSOCIATES, LLC

(57) ABSTRACT

An electronic apparatus including: a display panel, which includes first and second non-folding areas arranged in a first direction and a folding area disposed between the first and second non-folding areas, wherein the display panel is folded along a folding axis extending in a second direction crossing the first direction, the display panel further including pixels; a lower member disposed below the display panel, wherein the lower member includes a lower opening overlapping the folding area; and a sensing sensor including a first sensing adhesive layer disposed between the display panel and the lower member and adjacent to the display panel, a second sensing adhesive layer in contact with the lower member, and a digitizer disposed between the first sensing adhesive layer and the second sensing adhesive layer and including a plurality of coils, wherein the second sensing adhesive layer has a sensing opening that overlaps the folding area.

17 Claims, 28 Drawing Sheets

(58) Field of Classification Search
CPC . G06F 2203/04105; G06F 2203/04106; G06F 2203/04107; G06F 2203/04111; G09F 9/30; G09F 9/301; G09F 9/302
See application file for complete search history.

(56) References Cited

U.S. PATENT DOCUMENTS

| | | | |
|---|---|---|---|
| 2017/0278899 A1* | 9/2017 | Yang | H10K 71/00 |
| 2018/0136762 A1 | 5/2018 | Jeong et al. | |
| 2019/0116405 A1* | 4/2019 | Noh | G02F 1/13338 |
| 2019/0204867 A1* | 7/2019 | Song | G06F 1/1616 |
| 2019/0340959 A1* | 11/2019 | Park | H10K 71/00 |
| 2019/0346887 A1* | 11/2019 | Park | G06F 1/1681 |
| 2020/0097128 A1 | 3/2020 | Jung et al. | |
| 2020/0209998 A1 | 7/2020 | Shin et al. | |
| 2021/0357048 A1 | 11/2021 | Kishimoto et al. | |
| 2021/0407344 A1* | 12/2021 | Lee | H10K 59/8794 |
| 2022/0129094 A1* | 4/2022 | Tatsuno | G06F 1/1616 |

FOREIGN PATENT DOCUMENTS

| | | |
|---|---|---|
| KR | 10-2018-0055941 | 5/2018 |
| KR | 10-2020-0034388 | 3/2020 |
| KR | 10-2020-0084495 | 7/2020 |
| KR | 10-2021-0142039 | 11/2021 |

* cited by examiner

ELECTRONIC APPARATUS INCLUDING A LOWER MEMBER AND A SENSING SENSOR WITH OPENINGS OVERLAPPING A FOLDING AREA

CROSS-REFERENCE TO RELATED APPLICATION

This U.S. non-provisional patent application claims priority under 35 U.S.C. § 119 to Korean Patent Application No. 10-2020-0118820, filed on Sep. 16, 2020, the disclosure of which is incorporated by reference herein in its entirety.

TECHNICAL FIELD

The present disclosure relates to an electronic apparatus, and more particularly, to an electronic apparatus having increased reliability.

DISCUSSION OF RELATED ART

In the information society, electronic apparatuses are becoming increasingly used as a medium for delivering visual information. Examples of displays employed by electronic apparatuses include liquid crystal display's (LCDs), plasma display panels (PDPs), organic light emitting displays (OLEDs), field effect displays (FEDs), electrophoretic displays (EPDs), and the like.

Such an electronic apparatus ma receive an electrical signal to be activated. For example, the electronic apparatus may include a sensing sensor that senses an input applied from the outside of a display layer that displays an image.

The electronic apparatus may include various electrode patterns to be activated by an electrical signal. An area on which the electrode patterns are activated may display information or respond to a signal applied from the outside.

SUMMARY

An embodiment of the inventive concept provides an electronic apparatus including: a display panel, which includes first and second non-folding areas arranged in a first direction and a folding area disposed between the first and second non-folding areas, wherein the display panel is folded along a folding axis extending in a second direction crossing the first direction, the display panel further including a plurality of pixels; a lower member which is disposed below the display panel, wherein the lower member includes a lower opening overlapping the folding area; and a sensing sensor including a first sensing adhesive layer disposed between the display panel and the lower member and adjacent to the display panel, a second sensing adhesive layer in contact with the lower member, and a digitizer disposed between the first sensing adhesive layer and the second sensing adhesive layer and including a plurality of coils, wherein the second sensing adhesive layer has a sensing opening that overlaps the folding area.

The digitizer may include: a first base layer in contact with the first sensing adhesive layer; a bonding sheet disposed on the first base layer; a second base layer disposed on the bonding sheet; an inner adhesive layer disposed on the second base layer; and a protective layer disposed on the inner adhesive layer and in contact with the second sensing adhesive layer, the plurality of coils may include: first sensing coils disposed between the first base layer and the bonding sheet; and second sensing coils disposed between the second base layer and the inner adhesive layer, wherein at least a portion of the second sensing coils does not overlap the folding area.

The electronic apparatus may further include dummy patterns extending in same direction as the second sensing coils and insulated from the second sensing coils on the second base layer, wherein at least a portion of the dummy patterns does not overlap the folding area.

The protective layer may include a bent portion overlapping the folding area.

The protective layer may overlap the sensing opening, and the protective layer may have a protective opening through which the inner adhesive layer, which overlaps the folding area, is exposed.

The inner adhesive layer may overlap the protective opening, and the inner adhesive layer may have an inner opening through which the second base layer, which overlaps the folding area, is exposed.

The electronic apparatus may further include: a first cover layer, wherein the second sensing adhesive layer is disposed between the first cover layer and the lower member; and a second cover layer disposed between the first sensing adhesive layer and the first base layer, wherein the first cover layer has a cover opening through which the lower opening is exposed.

The digitizer may include a first sensing part and a second sensing part, which are spaced apart from each other with the folding area therebetween and are separately drivel by sensing external inputs different from each other, the first sensing part may include first-1 sensing coils extending in the first direction, and arranged in the second direction, and second-1 sensing coils extending in the second direction and arranged in the first direction, the second sensing, part may include first-2 sensing coils extending in the first direction, and arranged in the second direction, and second-2 sensing coils extending in the second direction and arranged in the first direction.

In the folding area, a distance between one of the first-1 sensing coils and one of the first-2 sensing coils may be about 1.5 mm or more.

The digitizer may include: a first base layer in contact with the first sensing adhesive layer; a bonding sheet disposed on the first base layer; a second base layer disposed on the bonding sheet; an inner adhesive layer disposed on the second base layer; and a protective layer disposed on the inner adhesive layer and in contact with the second sensing adhesive layer, wherein the first-1 sensing coils and the first-2 sensing coils are disposed between the first base layer and the bonding sheet, and the second-1 sensing coils and the second-2 sensing coils are disposed between the second base layer and the inner adhesive layer.

Each of the first-1 sensing coils and the first-2 sensing coils may include: a first coil overlapping a corresponding non-folding area of the first and second non-folding areas; and a second coil extending from the first coil to overlap the folding area.

One of the second-1 sensing coils and the second-2 sensing coils may overlap the folding area.

The electronic apparatus may further include first dummy patterns disposed between the first base layer and the bonding sheet, insulated from the first-1 sensing coils and the first-2 sensing coils, extending in the first direction, and arranged in the second direction.

The first dummy patterns may not overlap the folding area.

The electronic apparatus may further include second dummy patterns disposed between the second base layer and the inner adhesive layer, insulated from the second-1 sensing coils and the second-2 sensing coils, extending in the second direction, and arranged in the first direction.

The second dummy patterns may not overlap the folding area.

The first-1 sensing coils and the first-2 sensing coils may not overlap the folding area.

The second-1 sensing coils and the second-2 sensing coils may not overlap the folding area.

The digitizer may include a base layer in which the plurality of coils are embedded.

The digitizer may include: a first base layer in contact with the first sensing adhesive layer; a second base layer disposed on the first base layer; an inner adhesive layer disposed on the second base layer; and a protective layer disposed on the inner adhesive layer and in contact with the second sensing adhesive layer, the plurality of coils may include: first sensing coils disposed between the first base her and the second base layer; and second sensing coils disposed between the second base layer and the inner adhesive layer, at least portions of the first sensing coils and the second sensing coils may not overlap the folding area.

An embodiment of the inventive concept provides an electronic apparatus including: a display panel, which includes first and second non-folding areas arranged in a first direction and a folding area disposed between the first and second non-folding areas, wherein the display panel is folded along a folding axis extending in a second direction crossing the first direction, the display panel further including a plurality of pixels; a lower member which is disposed below the display panel, wherein the lower member includes a lower opening overlapping the folding area; and a sensing sensor including a first sensing adhesive layer disposed between the display panel and the lower member and adjacent to the display panel, a second sensing adhesive layer in contact with the lower member, and a digitizer disposed between the first sensing adhesive layer and the second sensing adhesive layer and including first sensing coils and second sensing coils, which are insulated from each other, wherein at least a portion of the first sensing coils crosses the folding area, and at least a portion of the second sensing coils does not overlap the folding area.

The first sensing coils include first long sides extending in the first direction and spaced apart from each other in the second direction and a first short side extending in the second direction and disposed between ends of the first long sides, and the second sensing coils include second long sides extending in the second direction and spaced apart from each other in the first direction and a second short side extending in the first direction and disposed between ends of the second long sides, wherein a portion of the first long sides overlaps the folding area.

A distance between two of the second long sides facing each other with the folding area therebetween is about 1.5 mm or more.

The second sensing adhesive layer may have a sensing opening overlapping the folding area.

The electronic apparatus may further include a dummy pattern disposed between the first sensing coils or between the second sensing coils, wherein the dummy pattern does not overlap the folding area.

An embodiment of the inventive concept provides an electronic apparatus including: a display panel having a folding area disposed between first and second non-folding areas; a lower member having a first opening corresponding to the folding area; and a sensing sensor disposed between the display panel and the lower member, the sensing sensor having a first sensing adhesive layer adjacent to the display panel, a second sensing adhesive layer in contact with the lower member and a digitizer between the first and second sensing adhesive layers, wherein the second sensing adhesive layer has a second opening corresponding the first opening.

The digitizer may include first sensing coils extended lengthwise in first direction and second sensing coils extended lengthwise in a second direction crossing the first direction, wherein lengthwise portions of the second sensing coils do not overlap the folding area and lengthwise portions of the first sensing coils overlap the folding area.

The electronic apparatus may further include a protective layer in contact with the second sensing adhesive layer, the protective layer having a third opening corresponding to the first opening.

The electronic apparatus may further include an inner adhesive layer in contact with the protective layer, the inner adhesive layer having a fourth opening corresponding to the first opening.

The digitizer may include first sensing coils intersecting second sensing coils, wherein some of the second sensing coils do not overlap the folding area.

BRIEF DESCRIPTION OF THE FIGURES

The above and other features of the inventive concept will become readily apparent by reference to the following detailed description when considered in conjunction with the accompanying drawings. In the drawings.

DETAILED DESCRIPTION OF THE EMBODIMENTS

Figure 1A:
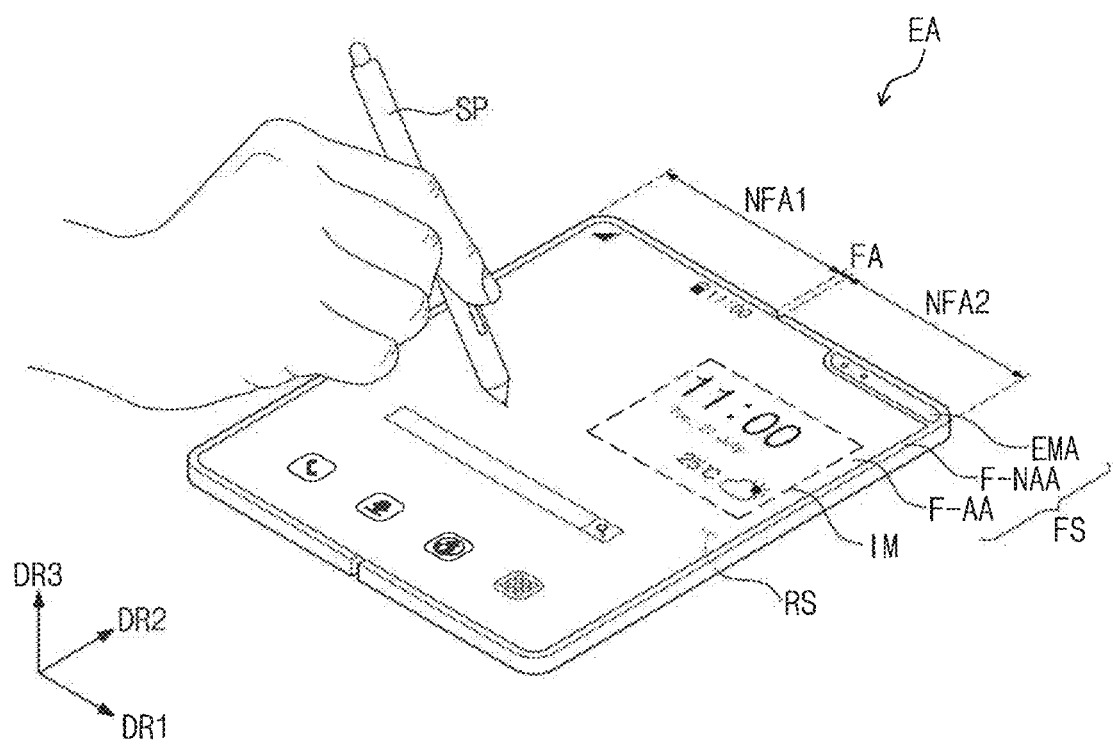
FIG. 1A is a perspective view illustrating an unfolded state of an electronic apparatus according to an embodiment of the inventive concept.

In this specification, it will be understood that when one component (or area, layer, portion, etc.) is referred to as being 'on', 'connected to', or 'coupled to' another component, it can be directly disposed/connected/coupled on/to the one component, or an intervening third component may also be present.

Like reference numerals may refer to like elements throughout the present disclosure. In addition, in the figures, the thickness, ratio, and dimensions of components may be exaggerated for clarity of illustration.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment. The terms of a singular form may include plural forms unless referred to the contrary.

In addition, terms such as "under", "below", "above", "upper", and the like are used for explaining the relationship of components illustrated in the drawings. The terms may be a relative concept and are described based on directions expressed in the drawings.

Hereinafter, embodiments of the inventive concept will be described with reference to the accompanying drawings.

Figure 1B:
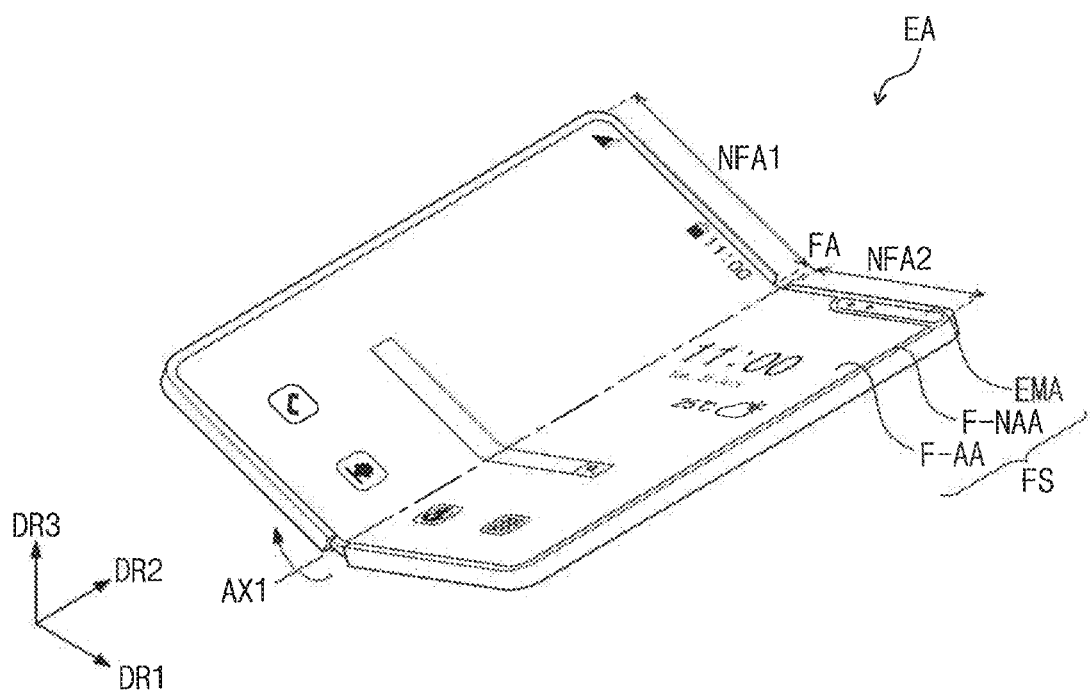
FIG. 1B is a perspective view of the electronic apparatus according to an embodiment of the inventive concept.
Figure 1C:
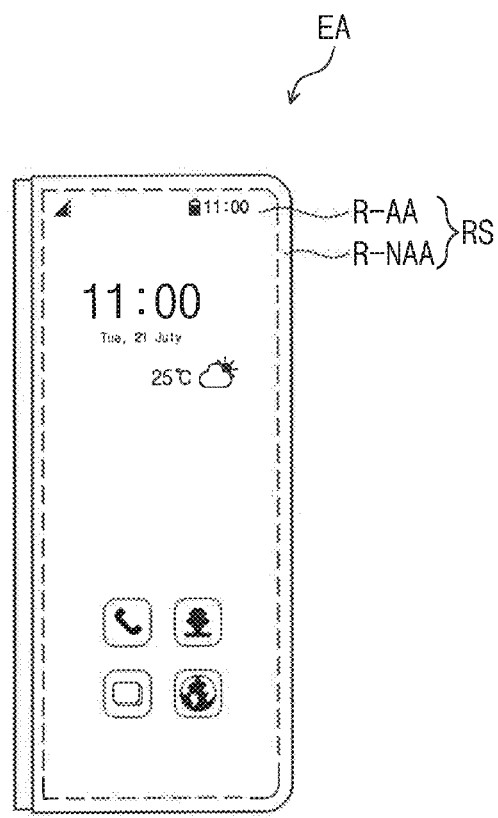
FIG. 1C is a plan view illustrating a folded state of the electronic apparatus according to an embodiment of the inventive concept.
Figure 1D:
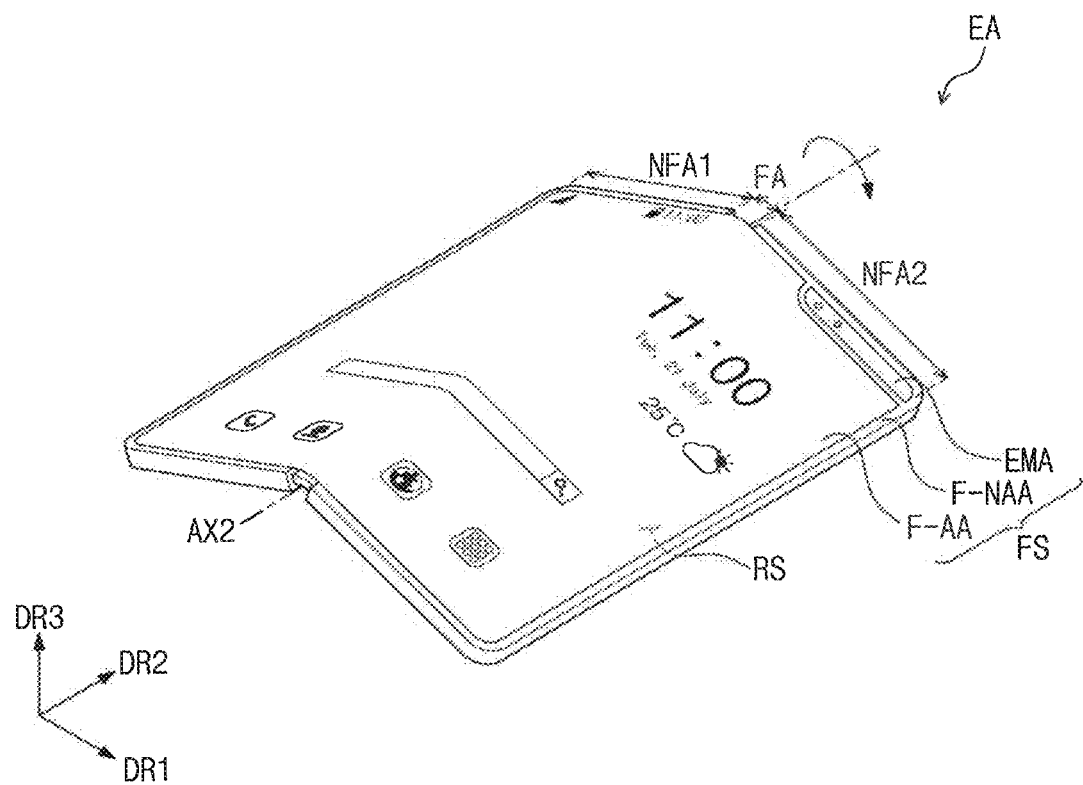
FIG. 1D is a perspective view of the electronic apparatus according to an embodiment of the inventive concept.
Figure 2:
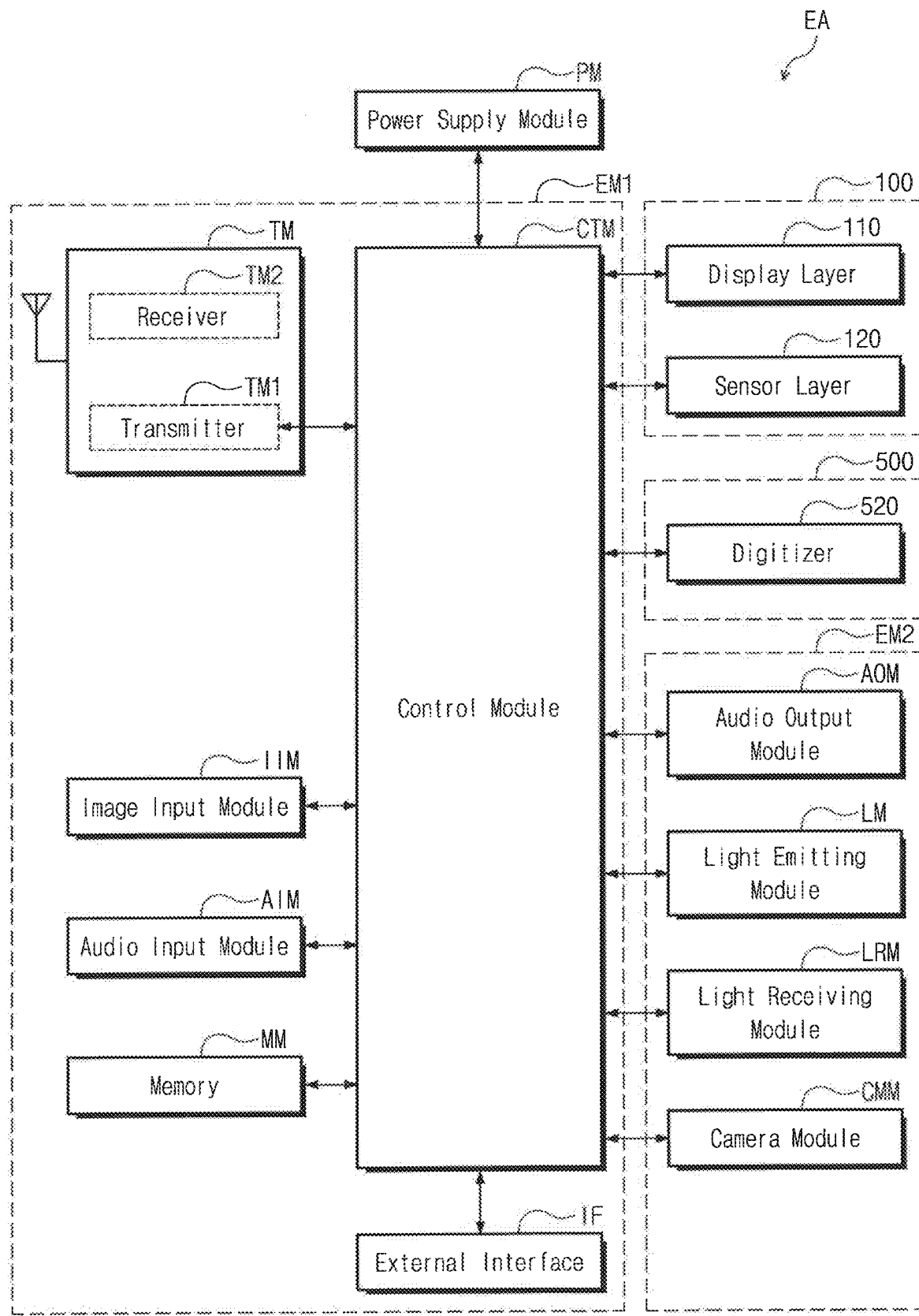
FIG. 2 is a block diagram of an electronic apparatus according to an embodiment of the inventive concept.

FIG. 1A is a perspective view illustrating an unfolded state of an electronic apparatus according to an embodiment of the inventive concept. FIG. 1B is a perspective view of the electronic apparatus according to an embodiment of the inventive concept. FIG. 1C is a view illustrating a folded state of the electronic apparatus according to an embodiment of the inventive concept. FIG. 1D is a perspective view of the electronic apparatus according to an embodiment of the inventive concept. FIG. 2 is a block diagram of the electronic apparatus according to an embodiment of the inventive concept.

Referring to FIG. 1A, an electronic apparatus EA may be an apparatus that is activated according to an electrical signal. The electronic apparatus EA may include various examples. For example, the electronic apparatus EA may be a tablet, a notebook, a computer, a smart television, and the like. In this embodiment, the electronic apparatus EA as a smart phone will be described as an example.

The electronic apparatus EA may display an image IM in a third direction DR3 on a first display surface FS parallel to each of first and second directions DR1 and DR2. The first display surface FS on which the image IM is displayed may correspond to a front surface of the electronic apparatus EA. However, the first display surface FS may be bent to correspond to both the front and back surface of the electronic apparatus EA. The image IM may include a still image as well as a dynamic image, e.g., a moving image. In FIG. 1A, an Internet search window and a clock window are illustrated as an example of the image IM.

In this embodiment, a front surface (or a top surface) or a rear surface tor a bottom surface) of each elements may depend on a direction in which the image IM is displayed. The front and rear surfaces may be opposite to each other in the third direction DR3. A normal direction of each of the front and rear surfaces may be parallel to the third direction DR3.

A distance between the front and rear surfaces in the third direction DR3 may correspond to a thickness/height of the electronic apparatus EA in the third direction DR3. The directions indicated as the first to third directions DR1, DR2, and DR3 may be a relative concept and thus changed into different directions.

The electronic apparatus EA may sense an external input applied from the outside. The external input may include various types of inputs provided from the outside of the electronic apparatus EA.

For example, the external input may include an external input (for example, finger or input component hovering) applied by a predetermined distance that is within the proximity or adjacent to the electronic apparatus EA. The external input may also include contact by a portion of the human body such as a user's hand. In addition, the external input may include various types such as force, pressure, temperature light, and the like. In addition, the electronic apparatus EA according to the inventive concept may sense an external input by a pen SP generating magnetic fields.

FIG. 1A illustrates an external input through a user's pen SP as an example. The pen SP may be mounted or detached inside or outside the electronic apparatus EA, and the electronic apparatus EA may provide and receive signals corresponding to the mounting and detachment of the pen SP. For example, the electronic apparatus EA may receive a signal indicating that the pen SP has been detached from its mounting position.

The electronic apparatus EA according to this embodiment may include the first display surface FS and a second display surface RS. The first display surface FS may include a first active area F-AA (e.g., an active area), a first peripheral area F-NAA (e.g., a peripheral area), and an electronic module area EMA. The second display surface RS may be a surface facing at least a portion of the first display surface FS.

The first peripheral area F-NAA is adjacent to the first active area F-AA. The first peripheral area F-NAA may have a predetermined color by a light blocking layer 360 to be described later. The first peripheral area F-NAA may surround the first active area F-AA. Accordingly, a shape of the first active area F-AA may be substantially defined by the first peripheral area F-NAA. However, this is merely an example, and the first peripheral area F-NAA may be disposed adjacent to only one side of the first active area F-AA or may be omitted.

Various electronic modules may be disposed on the electronic module area EMA. For example, the electronic module may include at least one of a camera, a speaker, an optical sensing sensor, or a thermal sensing sensor. The electronic module area EMA may sense an external subject received through the first and second display surfaces FS and RS or provide a sound signal such as voice to the outside through the first and second display surfaces FS and RS. The electric module may include a plurality of components, but is not limited to a specific embodiment.

The electronic module area EMA may be surrounded by the first active area F-AA and the first peripheral area F-NAA. However, the embodiment of the inventive concept is not limited thereto. For example, the electronic module area EMA may be surrounded by just the first peripheral area F-NAA. For example, the electronic module area EMA may be disposed on the first active area F-AA, but is not limited thereto.

The electronic apparatus EA according to this embodiment may include at least one folding area FA and a plurality of non-folding areas NFA1 and NFA2 extending from the folding area FA. The non-folding areas NFA1 and NFA2 may be spaced apart from each other with the folding area FA therebetween.

Referring to FIG. 1B, the electronic apparatus EA according to an embodiment of the inventive concept includes a virtual first folding axis AX1 extending in the second direction DR2. The first folding axis AX1 may extend along the second direction DR2 of the first display surface FS. In this embodiment, the non-folding areas NFA1 and NFA2 may extend from the folding area FA with the folding area FA therebetween.

For example, the first non-folding area NFA1 may extend along one side of the folding area FA in the first direction DR1, and the second non-folding area NFA2 may extend along the other side in the first direction DR1.

The electronic apparatus EA may be folded with respect to the first folding axis AX1 and thus be deformed in an in-folding state in which one area of the first display surface FS, which overlaps the first non-folding area NFA1, and the other area of the first display surface FS, which overlaps the second non-folding area NFA2, face each other. In other words, in the in-folding state, a first area of the first display surface ES overlapping the first non-folding area NFA1 and a second area of the first display surface FS overlapping the second non-folding area NFA2 may face each other.

Referring to FIG. 1C, in the electronic apparatus EA according to an embodiment of the inventive concept, the second display surface RS may be visually recognized by the user in the in-folded state. Here, the second display surface RS may include a second active area R-AA displaying an image. The second active area R-AA may be an area activated according to an electrical signal. The second active area R-AA is an area on which an image is displayed, and various types of external inputs are sensed.

A second peripheral area R-NAA is adjacent to the second active area R-AA. The second peripheral area R-NAA may have a predetermined color. The second peripheral area R-NAA may surround the second active area R-AA. The second display surface RS may further include an electronic module area on which the electronic modules including various elements are disposed, but the electronic module area is not limited thereto.

Referring to FIG. 1D, the electronic apparatus EA according to an embodiment includes a virtual second folding axis AX2 extending in the second direction DR2. The second folding axis AX2 may extend along the second direction DR2 on the second display surface RS.

The electronic apparatus EA may be folded with respect to the second folding axis AX2 and thus be determined in an out-folding state in which one area of the second display surface RS, which overlaps the first non-folding area NFA1, and the other area of the first display surface FS, which overlaps the second non-folding area NFA2, face each other.

However, the embodiment of the inventive concept is not limited thereto. For example, the electronic apparatus EA may be folded with respect to a plurality of folding axes so that a portion of the first display surface FS and a portion of the second display surface RS face each other, and the number of folding axes and the number of non-folding areas corresponding to the number of folding axes are not limited to a specific embodiment.

Referring to FIG. 2, the electronic apparatus EA according to an embodiment of the inventive concept may include a display panel 100, a sensing sensor 500, a power supply module PM, a first electronic module EM1, and a second electronic module EM2. The display panel 100, the sensing sensor 500, the power supply module PM, the first electronic module EM1, and the second electronic module EM2 may be electrically connected to each other.

The display panel 100 may include a display layer 110 and a sensor layer 120. Thea display layer 110 may be an element that generates an image. An image generated by the display layer 110 is visually recognized by the user from the outside through the first display surface FS.

The display layer 110 may be configured to generate an image. The display layer 110 may be an emission-type display layer, for example, the display layer 110 may be an organic light emitting display layer, a quantum dot display layer, an inorganic display layer, or a micro light emitting diode (LED) display layer.

For example, the display layer 110 may include a base layer, a circuit element layer including a transistor, a display element layer including a light emitting layer connected to the transistor, and an encapsulation layer covering the display element layer and including at least one inorganic and organic layer.

The sensor layer 120 may be disposed on the display layer 110 through a continuous process. In this case, the sensor layer 120 may be directly disposed on the display layer 110. In this case, a third component is not disposed between the sensor layer 120 and the display layer 110. In other words, a separate adhesive member may not be disposed between the sensor layer 120 and the display layer 110.

Alternatively, the sensor layer 120 may be bonded to the display layer 110 through an adhesive member The adhesive member may include any adhesive or adhesive agent.

The sensor layer 120 may include, for example, at least one insulating layer disposed on the encapsulation layer of the display layer 110 and conductive layers spaced apart from each other by the insulating layers. The first electronic module EM1 and the second electronic module EM2 include various functional modules for operating the electronic apparatus EA. The first electronic module EM1 may be directly mounted on a mother board electrically connected to the display panel 100 or may be mounted on a separate board and electrically connected to the mother board through a connector.

The first electronic module EM1 may include a control module CTM, a wireless communication module TM, an image input module IIM, an audio input module AIM, a memory MM, and an external interface IF. A portion of the modules may not be mounted on the mother board but electrically connected to the mother board through a flexible circuit board.

The control module CTM controls an overall operation of the electronic apparatus EA. The control module CTM may be a microprocessor. For example, the control module CTM may activate or inactivate the display panel 100. The control module CTM may control other modules such as the image input module IIM or the audio input module AIM on the basis of a touch signal received from the display panel 100.

The wireless communication module TM may transmit/receive a wireless signal to/from another terminal by using Bluetooth or Wi-Fi line, for example. The wireless communication module TM may transmit/receive an audio signal by using a general communication line. The wireless communication module TM includes a transmitter TM1 for modulating and transmitting a signal to be transmitted and a receiver TM2 for demodulating the received signal.

The image input module IIM processes the image signal to convert the processed image signal into image data that is capable of being displayed on the display panel 100. The audio input module AIM receives external audio signals by using a microphone during recording mode or a voice recognition mode to convert the received audio signal into electrical sound data.

The external interface IF serves as an interface connected to an external charger, a wired/wireless data port, and a card socket (for example, a memory card and a subscriber identity module (SIM)/user identity module (UIM) card).

The second electronic module EM2 may include an audio output module AOM, a light emitting module LM, a light receiving module LRM, and a camera module CMM. The above-described elements may be directly mounted on the mother board, may be mounted on a separate board and electrically connected to the display panel 100 through a connector, or may be electrically connected to the first electronic module EM1.

The audio output module AOM converts audio data received from the wireless communication module TM or audio data stored in the memory MM to output the converted audio data to the outside.

The light emitting module LM generates and outputs light. The light emitting module LM may output infrared rays. For example, the light emitting module LM may include an LED element. For example, the light receiving module LRM may sense infrared rays. The light receiving module LRM may be activated when infrared rays having a predetermined level or more is sensed. The light receiving module LRM may include a complementary metal-oxide semiconductor (CMOS) sensor. The infrared rays generated in the light emitting module LM may be outputted and then be reflected by an external subject (for example, a user's finger or face), and the reflected infrared rays may be incident into the light receiving module LRM. The camera module CMM photographs an external image.

The sensing sensor 500 may include a digitizer 520. The digitizer 520 may include a plurality of sensing coils and may sense an external input using an electromagnetic resonance (EMR) technique.

In the electromagnetic resonance (EMR) technique, a magnetic field may be generated in a resonant circuit provided inside the pen SP, and the vibrating magnetic field may induce a signal to a plurality of coils included in the digitizer 520 to sense a position of the pen SP through the signal induced to the coils. A description of the digitizer 520 will be described later.

The electronic apparatus EA according to an embodiment of the inventive concept may further include a transparent member disposed between the first and second electronic modules FM1 and EM2 and the display panel 100. The transparent member may be an optically transparent film so that an external input transmitted through the first display surface FS passes through the transparent member and is transmitted to the first and second electronic modules EM1 and EM2.

The transparent member may be attached to the rear surface of the display panel 100 or be disposed between the display panel 100 and the electronic module without an adhesive layer. The electronic apparatus EA according to an embodiment of the inventive concept may have various shapes, but is not limited to a specific embodiment.

Figure 3:
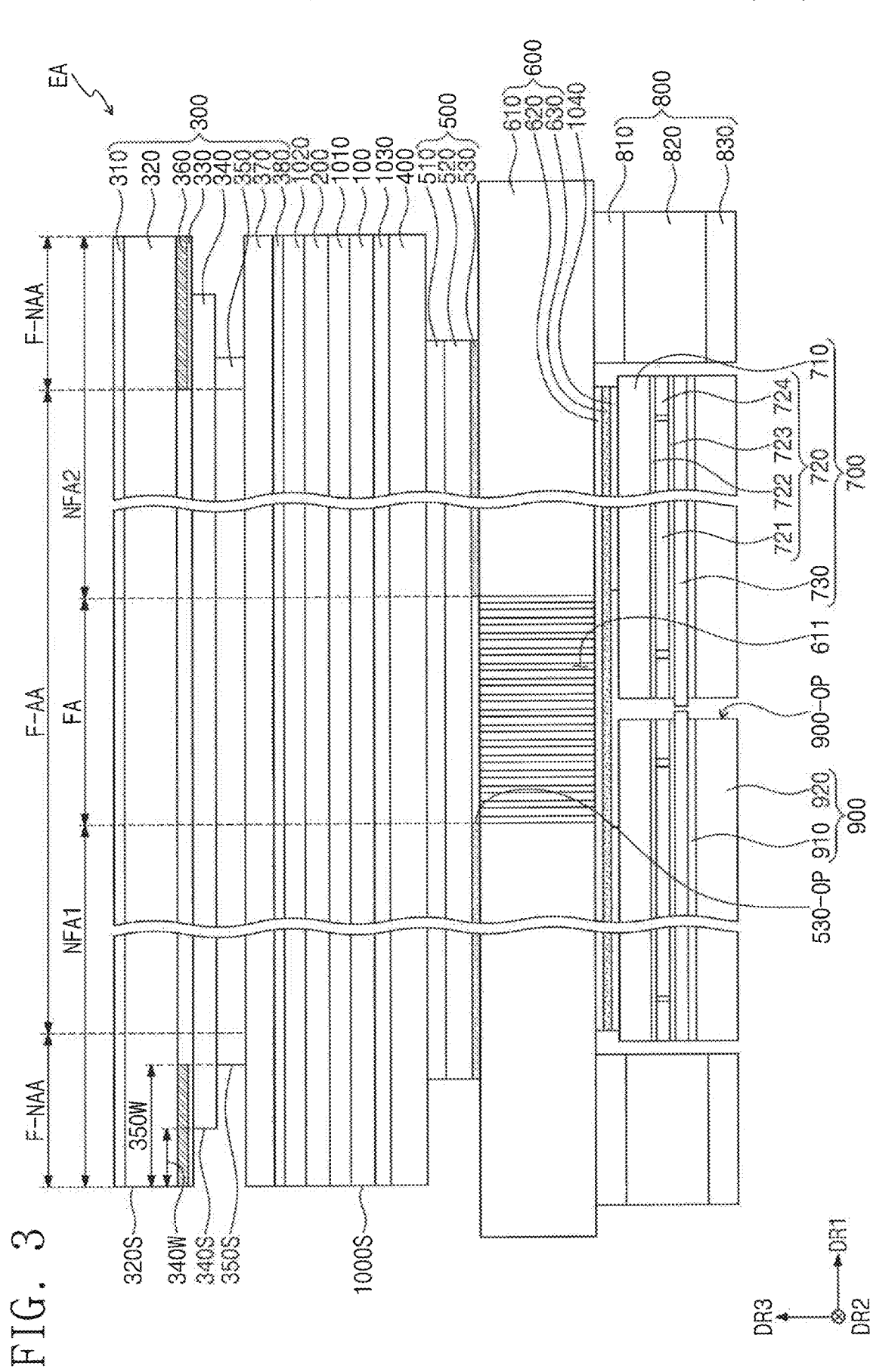
FIG. 3 is a cross-sectional view of an electronic apparatus according to an embodiment of the inventive concept.

FIG. 3 is a cross-sectional view of an electronic apparatus according to an embodiment of the inventive concept.

Referring to FIG. 3, the electronic apparatus EA according to an embodiment of the inventive concept may include a display panel 100, a sensing sensor 500, upper functional layers, and lower functional layers.

The upper functional layers may be disposed on the display panel 100. For example, the upper functional layers may include an anti-reflective member 200 and an upper member 300.

The display panel 100 is disposed between the upper member 300 and a lower member 600. In other words, the display panel 100 may be disposed between first and second members. As described above, the display layer 110 of the display panel 100 may function as a display device that displays an image, and the sensor layer 120 of the display panel 100 may function as an input device that senses an external input.

The anti-reflective member 200 is disposed on the display panel 100. The anti-reflective member 200 may reduce reflectance of external light incident from the outside. The anti-reflective member 200 may include a stretched synthetic resin film. For example, the anti-reflective member 200 may be provided by dyeing iodine compound on a polyvinyl alcohol film (PVA film). However, this is merely an example, and the material constituting the anti-reflective member 200 is not limited thereto.

The anti-reflective member 200 may be bonded to the display panel 100 through a first adhesive layer 1010. In other words, the first adhesive layer 1010 may be provided between the anti-reflective member 200 and the display panel 100. The first adhesive layer 1010 may be a transparent adhesive layer such as a pressure sensitive adhesive film (PSA), an optically clear adhesive film (OCA), or an optically clear resin (OCR). An adhesive layer described below may include the same material as the first adhesive layer 1010 and may include any adhesive or pressure-sensitive adhesive.

In an embodiment of the inventive concept, the first adhesive layer 1010 may be omitted. In this case, the anti-reflective member 200 may be directly disposed on the display panel 100. In the case, a separate adhesive layer may not be disposed between the anti-reflective member 200 and the display panel 100.

The upper member 300 may be disposed on the anti-reflective member 200. The upper member 300 includes a first hard coating layer 310, an upper protective layer 320, a first upper adhesive layer 330, a window 340, a second upper adhesive layer 350, a light blocking layer 360, an impact absorbing layer 370, and a second hard coating layer 380. The components included in the upper member 300 are not limited to the components described above. At least a portion of the above-described components may be omitted, and other components may be added. For example, a portion of the first upper adhesive layer 330 may be removed.

The first hard coating layer 310 may be a layer disposed on the outermost surface of the electronic apparatus EA. The first hard coating layer 310 may be a functional layer for improving use characteristics of the electronic apparatus EA and may be applied on the upper protective layer 320. For example, anti-fingerprint properties, anti-pollution properties, and anti-scratch properties may be improved by the first hard coating layer 310.

The upper protective layer 320 may be disposed below the first hard coating layer 310. The upper protective layer 320 may protect elements disposed below the upper protective layer 320. The first hard coating layer 310, an anti-fingerprint layer, and the like may be additionally provided on the upper protective layer 320 to improve properties such as chemical resistance and abrasion resistance. The upper protective layer 320 may include a film having an elastic modulus of about 15 GPa or less at room temperature. In an embodiment of the inventive concept, the upper protective layer 320 may be omitted. In this case, the first hard coating layer 310 may be adhered to the window 340.

The first upper adhesive layer 330 may be disposed below the upper protective layer 320. The upper protective layer 320 and the window 340 may be bonded to each other by the first upper adhesive layer 330.

The window 340 may be disposed below the first upper adhesive layer 330. The window 340 may include an optically transparent insulation material. For example, the window 340 may include a glass substrate or a synthetic resin film.

When the window 340 is the synthetic resin film, the window 340 may include a polyimide (Pl) film or a polyethylene terephthalate (PET) film.

The window 340 may have a single layered structure or a multilayered structure. For example, the window 340 may include a plurality of plastic films bonded to each other by using an adhesive or include a glass substrate and a plastic film, which are bonded to each other by using an adhesive. The second upper adhesive layer 350 may be disposed below the window 340. The window 340 and the impact absorbing layer 370 may be bonded to each other by the second upper adhesive layer 350.

In an embodiment of the inventive concept, a sidewall 340S of the window 340 and a sidewall 350S of the second upper adhesive layer 350 may be disposed inside sidewalls of other layers, for example, a sidewall 1000S of the display panel 100 and a sidewall 320S of the upper protective layer 320. The sidewall 340S of the window 340 may be extend beyond the sidewall 350S of the second upper adhesive layer 350. In addition the sidewall 1000S of the display panel 100 and the sidewall 320S of the upper protective layer 320 may extend beyond the sidewall 340S of the window 340. The active area FAA may be closer to the sidewall 350S of the second upper adhesive layer 350 than the sidewall 340S of the window 340. In addition, the active area F-AA may be closer to the sidewall 350S of the second upper adhesive layer 350 than the sidewall 1000S of the display panel 100 and the sidewall 320S of the upper protective layer 320.

A positional relationship between the layers may be changed by the folding operation of the electronic apparatus EA. According to an embodiment of the inventive concept, since the sidewall 340S of the window 340 is disposed inside the sidewall 1000S of the display panel 100 and the sidewall 320S of the upper protective layer 320, even though the positional relationship between the layers is changed when the electronic apparatus EA is folded, a possibility that the sidewall 340S of the window 340 protrudes from the sidewall 320S of the upper protective layer 320 may be reduced. Thus, a possibility that an external impact is transmitted through the sidewall 340S of the window 340 may be reduced. As a result, a probability of cracks occurring in the window 340 may be reduced.

The window 340 and the second upper adhesive layer 350 may be bonded to the impact absorbing layer 370 through a lamination process. In consideration of a lamination process tolerance, each of the window 340 and the second upper adhesive layer 350 may have an area less than that of the impact absorbing layer 370. In addition, the second upper adhesive layer 350 may have aft area less than that of the window 340.

When the first upper adhesive layer 330 and the second upper adhesive layer 350 are attached to each other, the window 340 may not slip to prevent a buckling phenomenon from occurring when the electronic apparatus EA is folded. However, according to an embodiment of the inventive concept, the second upper adhesive layer 350 may have an area less than that of the window 340. Thus, the first upper adhesive layer 330 may not be attached to the second upper adhesive layer 350, and a probability that foreign substances adhere to the second upper adhesive layer 350 may be reduced.

The impact absorbing layer 370 may be a functional layer for protecting the display panel 100 from an external impact. The impact absorbing layer 370 may be selected from films having an elastic modulus of about 1 GPa or more at room temperature. The impact absorbing layer 370 may be a stretched film including an optical function. For example, the impact absorbing layer 370 may be an optical axis control film. For example, the impact absorbing layer 370 may be a biaxially stretched PET film.

The second hard coating layer 380 may be provided on a surface of the impact absorbing layer 370. The second hard coating layer 380 may include an organic coating agent, an inorganic coating agent, or an organic/inorganic mixed coating agent and may not be limited to a specific embodiment as long as the material is capable of reducing haze.

Each of top and bottom surfaces of the impact absorbing layer 370 may include a curved surface. The top surface of the impact absorbing layer 370 may contact the second upper adhesive layer 350. Thus, the curved portion of the top surface of the impact absorbing layer 370 may be filled by the second upper adhesive layer 350. Thus, an optical issue (e.g., an increase in haze) may not occur on the top surface of the impact absorbing layer 370.

The light blocking layer 360 may be disposed below the upper protective layer 320. The light blocking layer 360 may be covered by the first upper adhesive layer 330. In other words, the light blocking layer 360 may be disposed between the upper protective layer 320 and a portion of the first upper adhesive layer 330. The light blocking layer 360 may be formed by being printed on a lower portion of the upper protective layer 320. The light blocking layer 360 may overlap the peripheral area F-NAA. However, the embodiment of the inventive concept is not limited thereto. For example, the light blocking layer 360 may be disposed between the impact absorbing layer 370 and the second upper adhesive layer 350, but is not limited thereto.

The light blocking layer 360 may be a colored layer and may be formed in a coating manner. The light blocking layer 360 may include a polymer resin and a pigment mixed with the polymer resin. The polymer resin may be, for example, an acrylic resin or polyester, and the pigment may be a carbon-based pigment. However, the material forming the light blocking layer 360 is not limited thereto.

The upper member 300 may be bonded to the anti-reflective member 200 through a second adhesive layer 1020. The second adhesive layer 1020 may include the same material as the first adhesive layer 1010 and may include any adhesive or pressure-sensitive adhesive.

The lower functional layers may be disposed below the display panel 100. For example, the lower functional layers may include a lower protective film 400, the lower member 600, a functional member 700, a step compensation member 800, and a cushion member 900. The components included in the lower functional layers are not limited to the components described above. At least a portion of the above-described components may be omitted, and other components may be added.

The lower protective film 400 may be bonded to a rear surface of the display panel 100 through a third adhesive layer 1030. The lower protective film 400 may prevent scratches from being generated in the rear surface of the display panel 100 during the process of manufacturing the display panel 100. The lower protective film 400 may be a colored polyimide film. For example, the lower protective film 400 may be an opaque yellow film, but is not limited thereto.

The lower member 600 may be disposed below the display panel 100. The lower member 600 may include an upper plate 610, a lower adhesive layer 620, and a cover layer 630. The components included in the lower member 600 are not limited to the components described above. At least a portion of the above-described components may be omitted, and other components may be added.

The upper plate 610 may support components disposed at an upper side. Heat dissipation performance of the electronic apparatus EA may be improved by the upper plate 610. The upper plate 610 may include a material having an elastic modulus of about 60 GPa or more at room temperature. For example, the upper plate 610 may include stainless steel. The upper plate 610 is not limited thereto, and the upper plate 610 may include one of aluminum, copper, and alloys thereof.

In the upper plate 610, a portion of the upper plate 610 overlapping the folding area FA may have a lower opening 611 defined therein. The plurality of lover openings 611 may be provided in the upper plate 610. The lower opening 611 may overlap the folding area FA, and the upper plate 610 may pass through the lower opening 611. For example, the lower opening 611 may overlap the folding area FA when viewed in the third direction DR3. When the display panel 100 is folded by the lower opening 611, a shape of the upper plate 610 overlapping the folding area FA may be more easily deformed.

The cover layer 630 may be attached to the upper plate 610 by the lower adhesive layer 620. The lower adhesive layer 620 may include any adhesive or an adhesive agent. The cover layer 630 may cover the lower opening 611 of the upper plate 610. Thus, foreign substances may be additionally prevented from being introduced into the lower opening 611.

The functional member 700 may be disposed below the lower member 600. The functional member 700 may be provided in plurality, and the plurality of functional members 700 may be spaced apart from each other. For example, one functional member 700 may be disposed on the first non-folding area NFA1, and another functional member 700 may be disposed on the second non-folding area NFA2.

Each of the functional members 700 may be attached to the lower member 600 by fourth adhesive layers 1040. For example, one fourth adhesive layer 1040 may be attached to a bottom surface of the lower member 600 overlapping the first non-folding area NFA1, and another fourth adhesive layer 1040 may be attached to the bottom surface of the lower member 600 overlapping the second non-folding area NFA2. In other words, the fourth adhesive layers 1040 may not overlap the folding area FA to expose a portion of the cover layer 630.

Each of the functional members may include a lower plate 710, a heat dissipation sheet 720, and an insulating film 730. The components included in each of the functional members 700 are not limited to the components described above. At least a portion of the above-described components may be omitted, and other components may be added.

The lower plate 710 is provided in plurality. One of the lower plates 710 may be disposed to overlap the first non-folding area NFA1 and a portion of the folding area FA, and the other of the lower plates 710 may be disposed to overlap the other portion of the folding area FA and the second non-folding area NFA2.

The lower plates 710 may be spaced apart from each other on the folding area FA. However, the lower plates 710 may be disposed as close as possible to support the area in which the lower opening 611 of the upper plate 610 is defined. For example, the lower plates 710 may prevent a shape of the area, in which the lower opening 611 of the lower plate 610 is defined, from being deformed by a pressure applied from an upper portion of the lower plate 610.

In addition, the lower plates 710 may prevent the components disposed above the functional member 700 from being deformed by the components disposed below the functional member 700.

Each of the lower plates 710 may include a metal alloy. For example, each of the lower plates 710 may include a copper alloy. However, the material forming the lower plate 710 is not limited thereto.

The heat dissipation sheet 720 may be attached to a lower portion of the lower plate 710. The heat dissipation sheet 720 may be a thermal conductive sheet having high thermal conductivity. For example, the heat dissipation sheet 720 may include a heat dissipation layer 721, a first beat dissipation adhesive layer 722, a second heat dissipation adhesive layer 723, and a gap tape 724.

The gap tape 724 may be attached to the first heat dissipation adhesive layer 722 and the second heat dissipation adhesive layer 723, which are spaced apart from each other, with the heat dissipation layer 721 therebetween. The gap tape 724 may be provided as a plurality of layers. For example, the gap tape 724 may include a base layer, an upper adhesive layer disposed on a top surface of the base layer, and a lower adhesive layer disposed on a bottom surface of the base layer.

The heat dissipation layer 721 may be attached to the lower plate 710 by the first heat dissipation adhesive layer 722. The heat dissipation layer 721 may be sealed by the first heat dissipation adhesive layer 722, the second heat dissipation adhesive layer 723, and the gap tape 724. The heat dissipation layer 721 may be a graphitized polymer film. The polymer film may be, for example, a polyimide film.

The insulating film 730 may be attached to a lower portion of the heat dissipation sheet 720. For example, the insulating film 730 may be attached to the second heat dissipation adhesive layer 723. An occurrence of rattling of the electronic apparatus EA may be prevented by the insulating film 730. The insulating film 730 may have a thickness of about 15 micrometers, but is not limited thereto.

The step compensation member 800 may be attached to the lower portion of the upper plate 610. The step compensation member 800 may be disposed below the upper plate 610 along the edge of the functional member 700. A gap may be formed between the step compensation member 800 and the edge of the functional member 700. For example, the lower adhesive layer 620 may be attached to a lower portion of one portion of the upper plate 610, and the step compensation member 800 may be attached to a lower portion of another portion of the upper plate 610.

The step compensation member 800 may compensate for a height difference between the elements, which are disposed below the upper plate 610, and the upper plate 610. Accordingly, a height of the step compensation member 800 in the third direction DR3 may be changed depending on the elements disposed below the upper plate 610.

The step compensation member 800 may include a first compensation adhesive layer 810, a step compensation film 820, and a second compensation adhesive layer 830. The first compensation adhesive layer 810 may be attached to the bottom surface of the upper plate 610. The step compensation film 820 mays be a synthetic resin film. The second compensation adhesive layer 830 may be attached to a bottom surface and a set of the step compensation film 820.

The cushion member 900 may be disposed below the functional member 700. The cushion member 900 may have a cushion opening 900-OP, which at least partially overlaps the folding area FA. The cushion opening 900-OP may be formed so that the cushion member 900 passes therethrough. The cushion opening 900-OP may be coincident with a gap between adjacent functional members 700. The cushion member 900 may protect the display panel 100 from an impact transmitted from a lower side of the display panel 100.

The cushion member 900 may include a material capable of absorbing an impact. For example, the cushion member 900 may include one of foam and sponge. The foam may include polyurethane foam or thermoplastic polyurethane foam.

When the cushion member 900 includes foam, a barrier film stay be added as a base layer in the cushion member 900, and a foaming agent may be foamed on the barrier film to form the cushion member 900.

The cushion member 900 may be disposed between the lower protective film 400 and the sensing sensor 500, but is not limited to a specific embodiment.

The sensing sensor 500 may be disposed below the display panel 100. For example, the sensing sensor 500 may be disposed between the upper plate 610 and the lower protective film 400.

The sensing sensor 500 may include a first sensing adhesive layer 510, a digitizer 520, a second sensing adhesive layer 530, and a shielding layer 540.

The first sensing adhesive layer 510 couples the lower protective film 400 to the digitizer 520. The second sensing adhesive layer 530 couples the digitizer 520 to the upper plate 610. The first and second sensing adhesive layers 510 and 530 may be a transparent adhesive layer such as a pressure sensitive adhesive film (PSA), an optically clear adhesive film (OCA), or an optically clear resin (OCR).

The digitizer 520 may be disposed between the first sensing adhesive layer 510 and the second sensing adhesive layer 530. The digitizer 520 may include a plurality of sensing coils and may sense an external input in an electromagnetic resonance (EMR) manner. The digitizer 520 may sense an external input in a manner that is different from that of the sensor layer 120 of the display panel 100. For example, the digitizer 520 may sense a signal transmitted by the pen SP (see FIG. 1A), which generates a magnetic field, among external inputs.

In the second sensing adhesive layer 530 according to an embodiment of the inventive concept, a sensing opening 530-OP overlapping the folding area FA may be formed. The sensing openings 530-OP may overlap the plurality of lower openings 611. In other words, the second sensing adhesive layer 530 may not overlap the plurality of lower openings 611.

According to an embodiment of the inventive concept, since the second sensing adhesive layer 530 coupling the digitizer 520 to the lower upper plate 610 includes the sensing opening 530-OP overlapping the folding area FA, when the electronic apparatus ED is folded, the shape of the sensing sensor 500 overlapping the folding area FA may be more easily deformed. Accordingly, stress applied to the sensing coils overlapping the folding area FA among the plurality of sensing coils included in the digitizer 520 may be reduced, and thus, the sensing coils may not be cracked. Therefore, the electronic apparatus EA having increased reliability may be provided.

Figure 20:
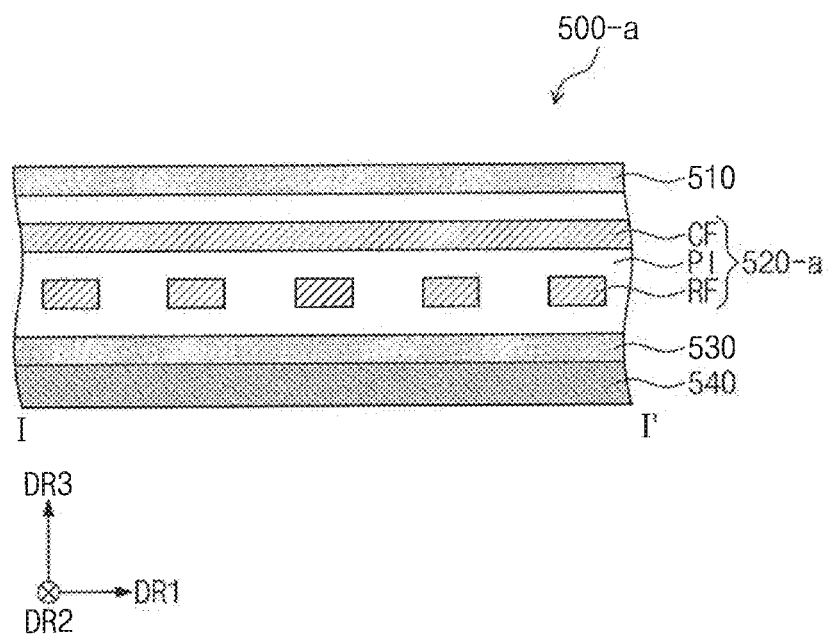
FIG. 20 is a cross-sectional view of a sensing sensor according to an embodiment of the inventive concept.
Figure 21:
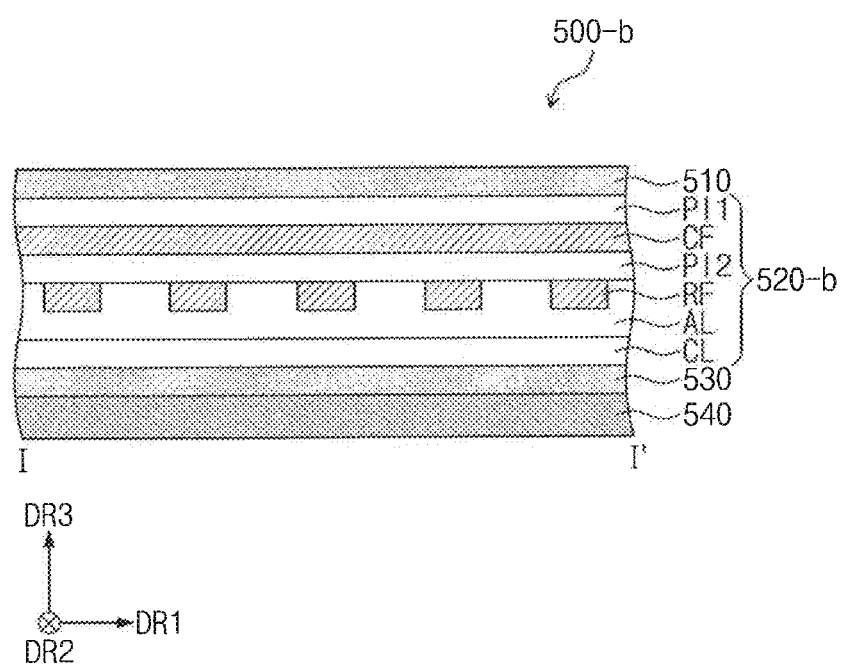
FIG. 21 is a cross-sectional view of a sensing sensor according to an embodiment of the inventive concept.

Although not shown in FIG. 3, the shielding layer 540 disposed between the digitizer 520 and the second sensing adhesive layer 530 may be further provided, as shown in FIGS. 20 and 21. The shielding layer 540 may prevent electrical interference between the elements, which are disposed below the digitizer 520, and the digitizer 520. The shielding layer 540 may include magnetic metal powder (MMP). However, the material of the shielding layer 540 is not limited thereto and may include one of permalloy, which is an alloy of nickel (Ni) and iron (Fe), invar, and stainless steel. Thus, the electronic apparatus EA having increased visibility may be provided.

Figure 4:
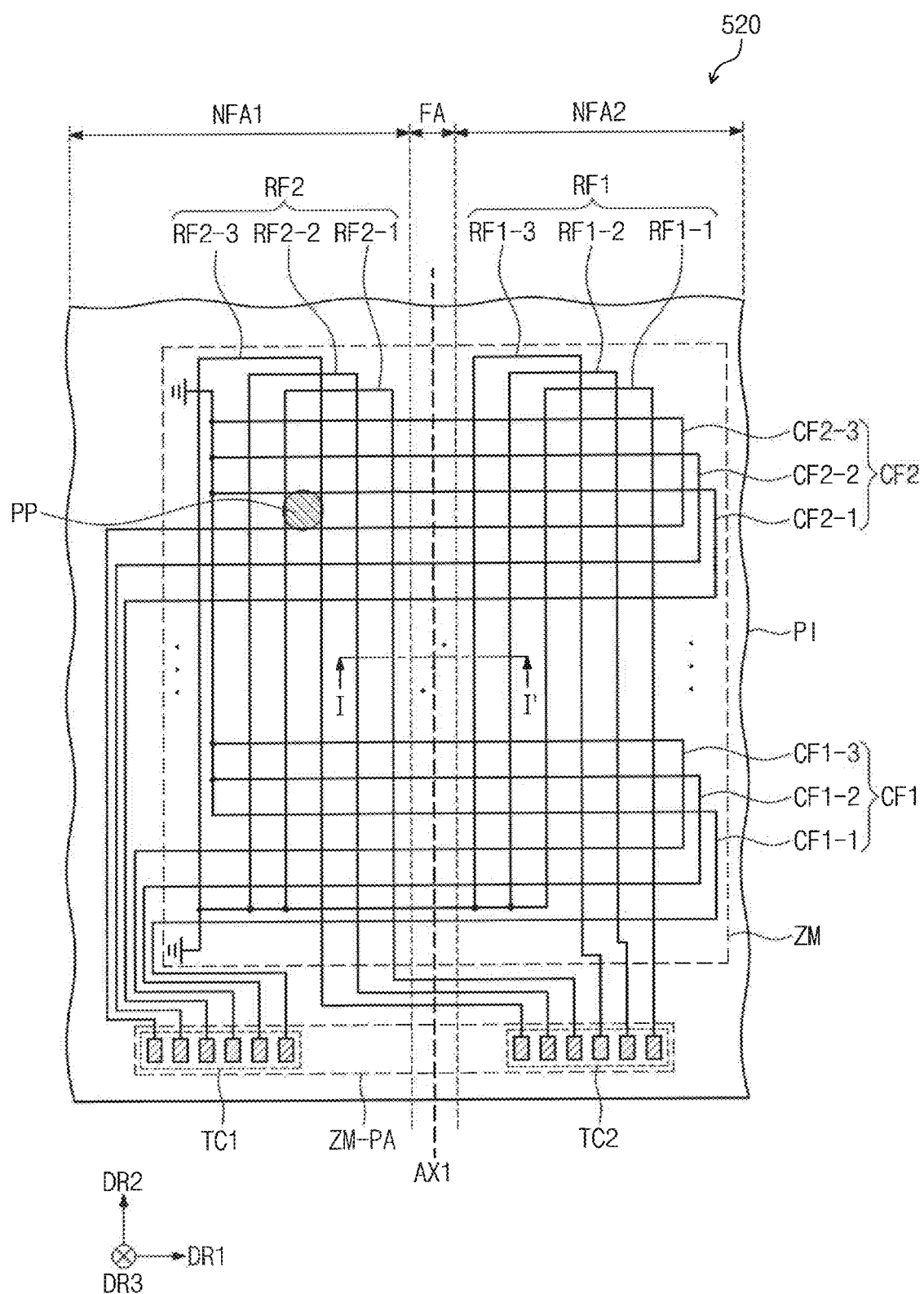
FIG. 4 is a plan view of a sensing sensor according to an embodiment of the inventive concept.
Figure 5:
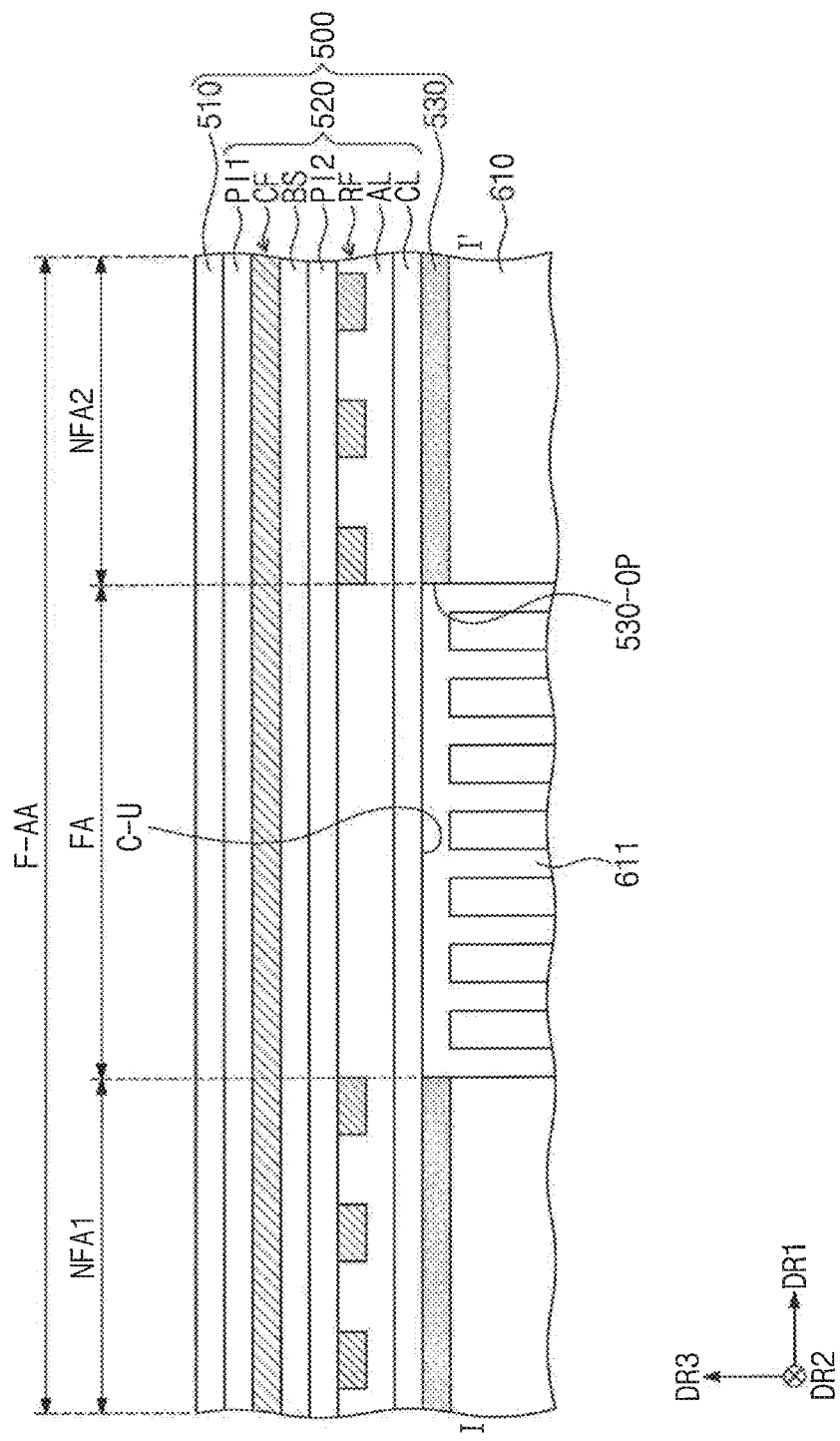
FIG. 5 is a cross-sectional view taken along line I-I' of FIG. 4.

FIG. 4 is a plan view of the sensing sensor according to an embodiment of the inventive concept. FIG. 5 is a cross-sectional view taken along line I-I' of FIG. 4. FIG. 5 mainly illustrates an arrangement relationship between the digitizer 520 adjacent to the folding area FA and the upper plate 610 among the elements of the electronic apparatus EA described with reference to FIG. 3.

Referring to FIG. 4, the digitizer 520 may detect an external input in the electromagnetic resonance (EMR) manner. The digitizer 520 may include a base layer PI, digitizer sensors CF1, CF2, RF1, and RF2 and a plurality of digitizer pads TC1 and TC2. The digitizer 520 according to the present embodiment may include a single sensing part ZM for sensing an input of the pen SP (see FIG. 1A) and a sensing pad part ZM-PA connected to the sensing part ZM. The single sensing part ZM may include the digitizer sensors CF1, CF2, RF1, and RF2, and the sensing pad part ZM-PA may include the digitizer pads TC1 and TC2.

The base layer PI may be a base layer on which the digitizer sensors CF1, CF2, RF1, and RF2 are disposed. The base layer PI may include an organic material. For example, the base layer BL may include polyimide (PI). The base layer PI may be provided as a plurality of layers including a first base layer PI1 and a second base layer PI2 or may be provided as a single layer, as described later.

The first digitizer sensors CF1 and CF2 include a plurality of first sensing coils CF1-1, CF1-2, CF1-3, CF2-1, CF2-2, and CF2-3, and the second digitizer sensors RF1 and RF2 include a plurality of second sensing coils RF1-1, RF1-2, RF1-3, RF2-1, RF2-2, and RF2-3.

The first sensing coils CF-1-1, CF1-2, CF1-3, CF2-1, CF2-2, and CF2-3 may have a coil shape connected to each other. For example, each of the first sensing coils CF1-1, CF1-2, CF1-3, CF2-1, CF2-2, and CF2-3 may include long sides, which extend in the first direction DR1 and are spaced apart from each other in the second direction DR2, and a short side extending in the second direction DR2. The short side may be disposed between the long sides to connect the long sides to each other. In this embodiment, the long sides of the first sensing coils CF1-1, CF1-2, CF1-3, CF2-1, CF2-2, and CF2-3 may pass through the folding area FA, and the short side may be disposed at a right side of the second non-folding area NFA2 and connected to ends of each the long sides.

The second sensing coils RF1-1, RF1-2, RF1-3, RF2-1, RF2-2, and RF2-3 may have a coil shape connected to each other. For example, each of the second sensing coils RF1-1, RF1-2, RF1-3, RF2-1, RF2-2, and RF2-3 may include long sides, which extend in the second direction DR2 and are spaced apart from each other in the first direction DR1, and a short side extending in the first direction DR1. The short side may be disposed between the long sides to connect the long sides to each other. In this embodiment, the long sides of each of the second sensing coils RF1-1, RF1-2, RF1-3, RF2-1, RF2-2, and RF2-3 may not overlap the folding area FA, and the short side may be disposed at upper portions of each of the first and second non-folding areas NFA1 and NHA2 and connected to ends of each of the long sides.

The second sensing coils RF1-1, RF1-2, RF1-3, RF2-1, RF2-2, and RF2-3 according to an embodiment of the inventive concept may extend in the second direction DR2 that is the same direction as the virtual folding axis AX1.

The first digitizer sensors CF1 and CF2 correspond to input coils of the electromagnetic resonance-type sensing sensor 500, and the second digitizer sensors RF1 and RF2 correspond to output coils of the electromagnetic resonance-type sensing sensor 500.

The first sensing coils CF1-1, CF1-2, CF1-3, CF2-1, CF2-2, and CF2-3 and the second sensing coils RF1-1, RF1-2, RF1-3, RF2-1, RF2-2, and RF2-3 may be insulated from each other in the base layer PI. Each of the first sensing coils CF1-1, CF1-2, CF1-3, CF2-1, CF2-2, and CF2-3 is connected to corresponding first digitizer pads TC1, and each of the second sensing coils RF1-1, RF1-2, RF1-3, RF2-1, RF2-2, and RF2-3 is connected to corresponding second digitizer pads TC2.

A flexible circuit board connected to the first and second digitizer pads TC1 and TC2 and a main circuit board connected to the flexible circuit board to drive the digitizer 520 may be provided.

Each of the first sensing coils CF1-1, CF1-2, CF1-3, CF2-1, CF2-2, and CF2-3 receives scan signals activated in different sections. Each of the first sensing coils CF1-1, CF1-2, CF1-3, CF2-1, CF2-2, and CF2-3 generates a magnetic field in response to corresponding scan signal.

When the pen SP (see FIG. 1A) is adjacent to the first sensing coils CF1-1, CF1-2, CF1-3, CF2-1, CF2-2, and CF2-3, the magnetic field induced from the first sensing coils CF1-1, CF1-2, CF1-3, CF2-1, CF2-2, and CF2-3 resonates with the resonant circuit of the pen SP, and the pen SP generates a resonant frequency. Here, the pen SP may have an LC resonant circuit including an inductor and a capacitor.

The second sensing coils RF1-1, RF1-2, RF1-3, RF2-1, RF2-2, and RF2-3 output sensing signals according to the resonant frequency of the input unit to the second digitizer pads TC2.

In FIG. 4, a central portion is assumed as an input point PP on an area an which the second sensing coil CF2-2 of the first sensing coils CF1-1, CF-3, CF2-1, CF2-2, and CF2-3, and the second sensing coil CF2-2 of the second sensing coils RF1-1, RF1-2, RF1-3, RF2-1, and RF2-3 cross each other.

The sensing signal output from the second sensing coil CF2-2 of the first sensing coils CF1-1, CF1-2, CF1-3, CF2-1, CF2-2, and CF2-3 has a level higher than that of each of the sensing signals output from the remaining first sensing coils CF1-1, CF1-2, CF1-3, CF2-1, and CF2-3. In other words, the sensing signal output from the second sensing coil CF2-2 can be differentiated from the sensing signals output from the remaining first sensing coils CF1-1, CF1-2, CF1-3, CF2-1, and CF2-3.

The sensing signal output from the second sensing coil RF2-2 of the second sensing coils RF1-1, RF1-2, RF1-3, RF2-1, RF2-2, and RF2-3 has a level higher than that of each of the sensing signals output from the remaining second sensing coils RF1-1, RF1-2, RF1-3, RF2-1, and RF2-3. In other words, the sensing signal output from the second sensing coil RF2-2 can be differentiated from the sensing signals output from the remaining second sensing coils RF1-1, RF1-2, RF1-3, RF2-1, and RF2-3.

Each of the sensing signals output from the first sensing coil RF2-1 and the third sensing coil RF2-3 of second sensing coils RF1-1, RF1-2, RF1-3, RF2-1, RF2-2, and RF2-3 has a level lower than that of the sensing signal output from the second sensing coil RF2-2. In addition, each of the sensing signals output from the first sensing coil RF2-1 and the third sensing coil RF2-3 of the second sensing coils RF1-1, RF1-2, RF1-3, RF2-1, RF2-2, and RF2-3 has a level lower than that of each of the sensing signals output from the remaining second sensing coils RF1-1, RF1-2, and RF1-3.

Two-dimensional (2D) coordinate information of the input point PP by the pen SP may be calculated based on a time at which the sensing signal output from the second sensing coil RF2-2, which has a high level and a relative position of the second sensing coil RF2-2 with respect to the second sensing coils RF1-1, RF1-2, RF1-3, RF2-1 and RF2-3.

In an embodiment of the inventive concept, some of the first and second sensing coils CF1-1, CF1-2, CF1-3, CF2-1, CF2-3, RF1-1, RF1-2, RF1-3, RF2-1, and RF2-3 may be partially omitted on the area overlapping the folding area FA and spaced apart from the folding area FA, but the inventive concept is not limited thereto.

Referring to FIG. 5, the sensing sensor 500 according to an embodiment of the inventive concept may include a first sensing adhesive layer 510, a second sensing adhesive layer 530, and a digitizer 520 disposed between the first sensing adhesive layer 510 and the second sensing adhesive layer 530.

The digitizer 520 may include a first base layer PI1 in contact with the first sensing adhesive layer 510, a bonding sheet BS disposed on the first base layer PI1, a second base layer PI2 disposed on the bonding sheet BS, an inner adhesive layer AL disposed on the second base layer PI2, and a protective layer CL disposed on the inner adhesive layer AL and in contact with the second sensing adhesive layer 530.

Hereinafter, a stacking order according to embodiments in the digitizer 520 will be described as a stacking order according to a method for manufacturing the digitizer 520. For example, the first base layer PI1 is disposed "on" the first sensing coil CF with respect to the thickness direction DR3 of the electronic apparatus EA, but according to an order of the method for manufacturing the digitizer, the first base layer PI1 may be described as being disposed on the first base layer PI1 and covered by the bonding sheet BS.

The digitizer 520 may include a first sensing coil CF disposed on the first base layer PI1 and covered by the bonding sheet BS and a second sensing coil RF disposed on the second base layer PI2 and covered by the inner adhesive layer AL.

The first sensing coil CF may be one of the first sensing coils CF1-1, CF1-2, CF1-3, CF2-1, CF2-2, and CF2-3 described above in FIG. 4, and the second sensing coil RF may be one of the second sensing coils RF1-1, RF1-2, RF1-3, RF2-1, RF2-2, and RF2-3 described above in FIG. 4.

In the second sensing adhesive layer 530 according to an embodiment of the inventive concept, a sensing opening 530-OP overlapping the folding area FA may be provided. For example, the sensing opening 530-OF may extend from a side of the first non-folding area NFA1 to a side of the second non-folding area NFA2. The sensing opening 530-OP may overlap the plurality of lower openings 611.

The sensing opening 530-OP may be a side surface of the second sensing adhesive layer 530 that is exposed by allowing the second sensing opening 53-OP to pass therethrough. In this embodiment, one surface C-U of the protective layer CL overlapping the folding area FA may be exposed by the sensing opening 530-OP of the second sensing adhesive layer 530.

In this embodiment, the sensing coil of the first sensing coil CF and the second sensing coil RF, which extends in the same direction as the first folding axis AX1 (see FIG. 1B) may be spaced apart from the folding area FA.

For example, in the folding area FA, the first folding axis AX1 may extend in the second direction DR2, and the second sensing coil RF extending in the second direction DR2 may be spaced apart from the folding area FA so as not to overlap the folding area FA. In more detail, the coils disposed in the sensing part ZM of FIG. 4 among the second sensing coils RF1-1, RF1-2, RF1-3, RF2-1, RF2-2, and RF2-3 corresponding to the second sensing coil RF may not overlap the folding area FA, and at least a portion of the coils disposed outside the sensing part ZM and connected to the second digitizer pad TC2 may overlap the folding area FA. For example, the coils disposed in the sensing part ZM of FIG. 4 among the second sensing coils RF1-1, RF1-2, RF1-3, RF2-1, RF2-2, and RF2-3 corresponding to the second sensing coil RF are spaced apart from the folding area FA in the first direction DR1. However, the coils outside the sensing part ZM and connected to the left side of the second digitizer pad TC2 may overlap the folding area FA.

According to this embodiment, the second sensing adhesive layer 530 may include the sensing opening 530-OP overlapping the folding area FA, and the second sensing coil RF extending in the same direction as the extension direction of the folding axis AX1 may not overlap the folding area FA. Thus, when the electronic apparatus EA is folded, the shape of the sensing sensor 500 overlapping the folding area FA may be more easily deformed.

Accordingly, stress applied to the sensing coils overlapping the folding area FA among the plurality of sensing coils included in the digitizer 520 may be reduced to fewer if any of the sensing coils from being cracked. Therefore, the electronic apparatus EA having increased reliability may be provided.

An embodiment of the inventive concept provides an electronic apparatus EA including: a display panel 100, which includes first and second non-folding areas NFA1/NFA2 arranged in a first direction DR1 and a folding area FA disposed between the first and second non-folding areas NFA1/NFA2, wherein the display panel 100 is folded along a folding axis AX1 extending in a second direction DR2 crossing the first direction DR1, the display panel 100 further including a plurality of pixels. The electronic apparatus EA further includes a lower member 600 which is disposed below the display panel 100, wherein the lower member 600 comprises a lower opening 611 overlapping the folding area FA; and a sensing sensor 500 including a first sensing adhesive layer 510 disposed between the display panel 100 and the lower member 600 and adjacent to the display panel 100, a second sensing adhesive layer 530 in contact with the lower member 600, and a digitizer 520 disposed between the first sensing adhesive layer 510 and the second sensing adhesive layer 530 and including a plurality of coils CF/RF, wherein the second sensing adhesive layer 530 has a sensing opening 530-OP that overlaps the folding area FA.

Figure 6:
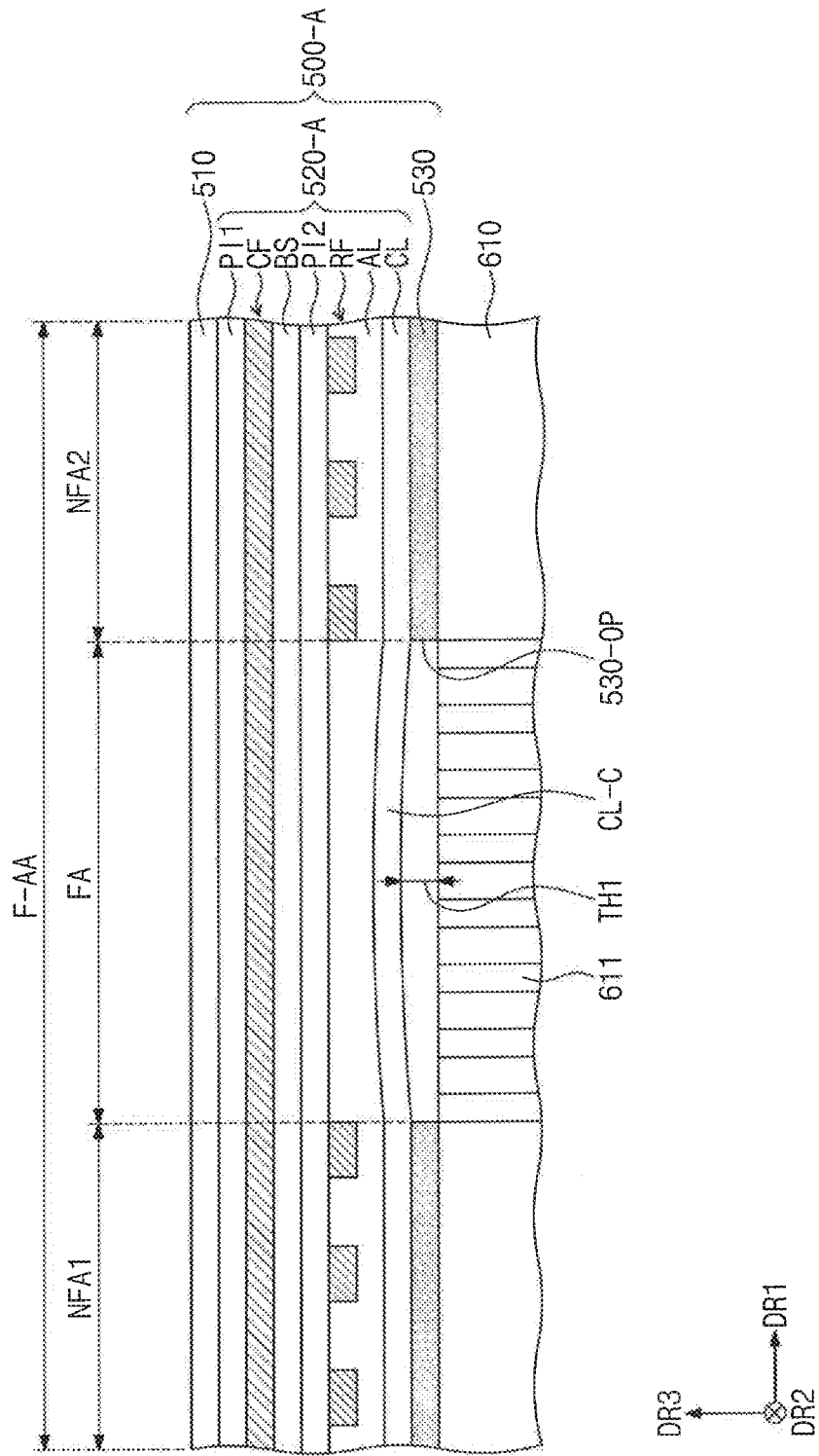
FIG. 6 is a cross-sectional view illustrating some elements of the electronic apparatus according to an embodiment of the inventive concept.
Figure 7:
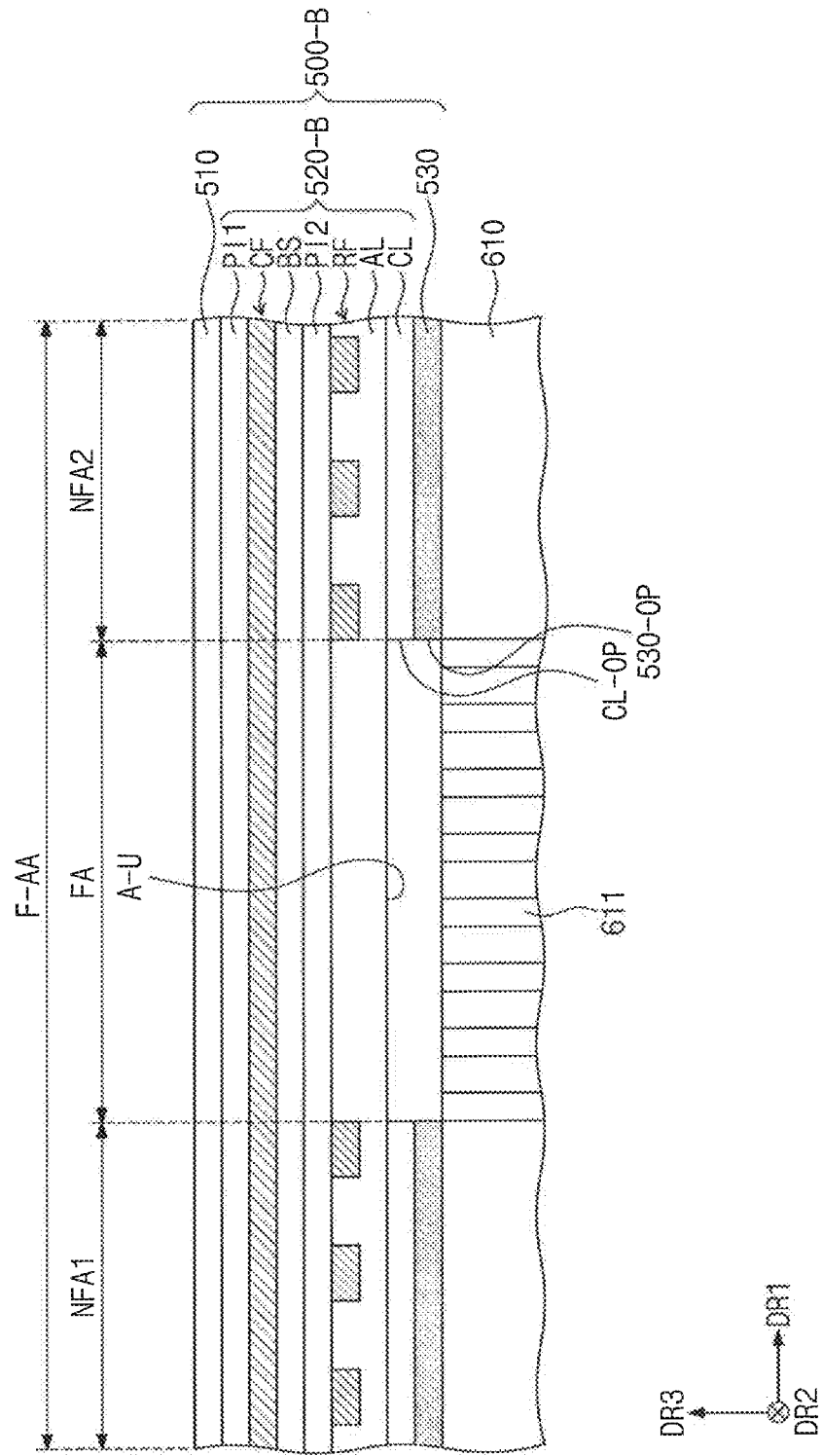
FIG. 7 is a cross-sectional view illustrating some of the elements of the electronic apparatus according to are embodiment of the inventive concept.
Figure 8A:
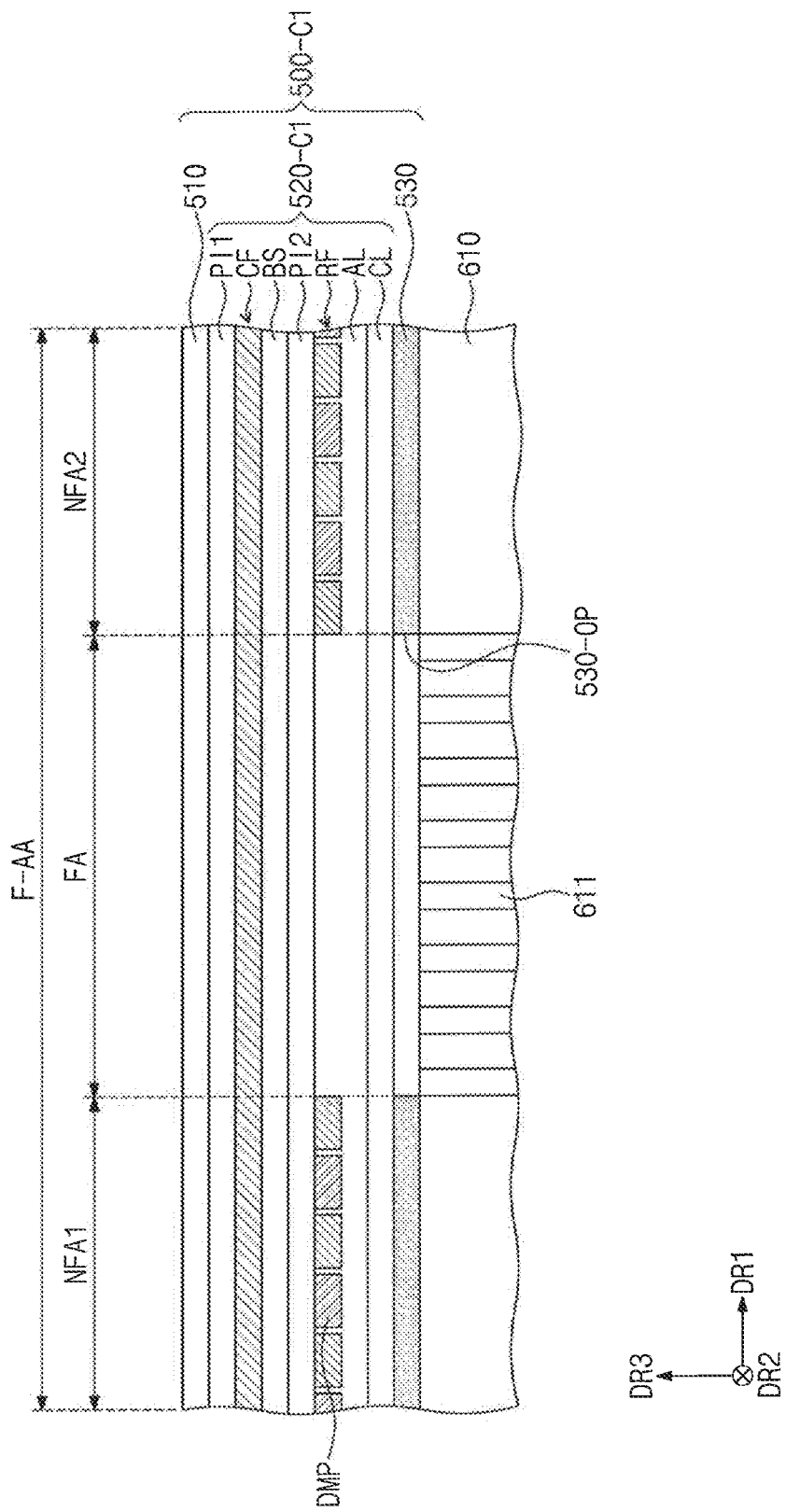
FIG. 8A is a cross-sectional view illustrating some of the elements of the display device according to an embodiment of the inventive concept.
Figure 8B:
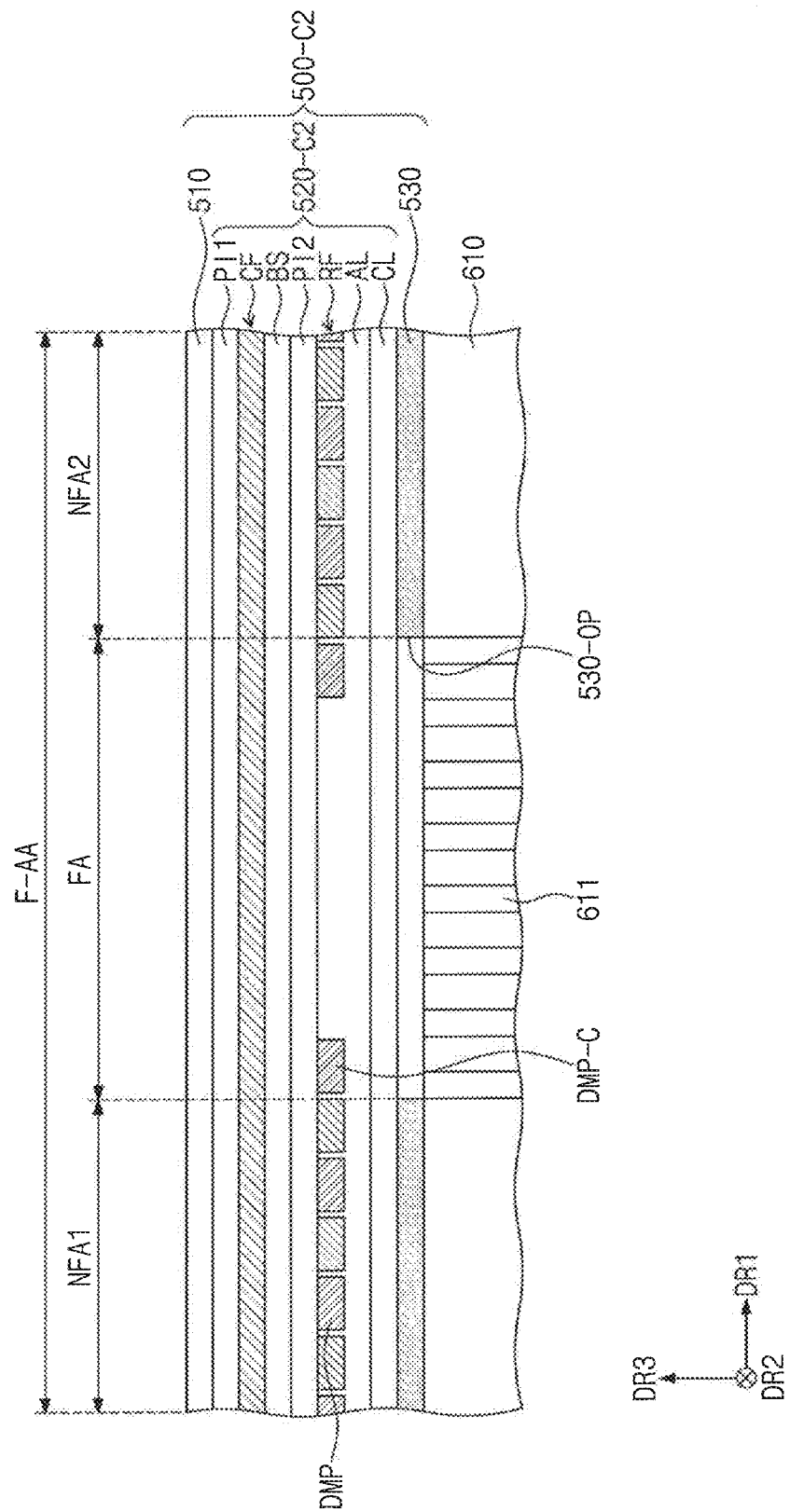
FIG. 8B is a cross-sectional view illustrating some of the elements of the electronic apparatus according to an embodiment of the inventive concept.
Figure 9:
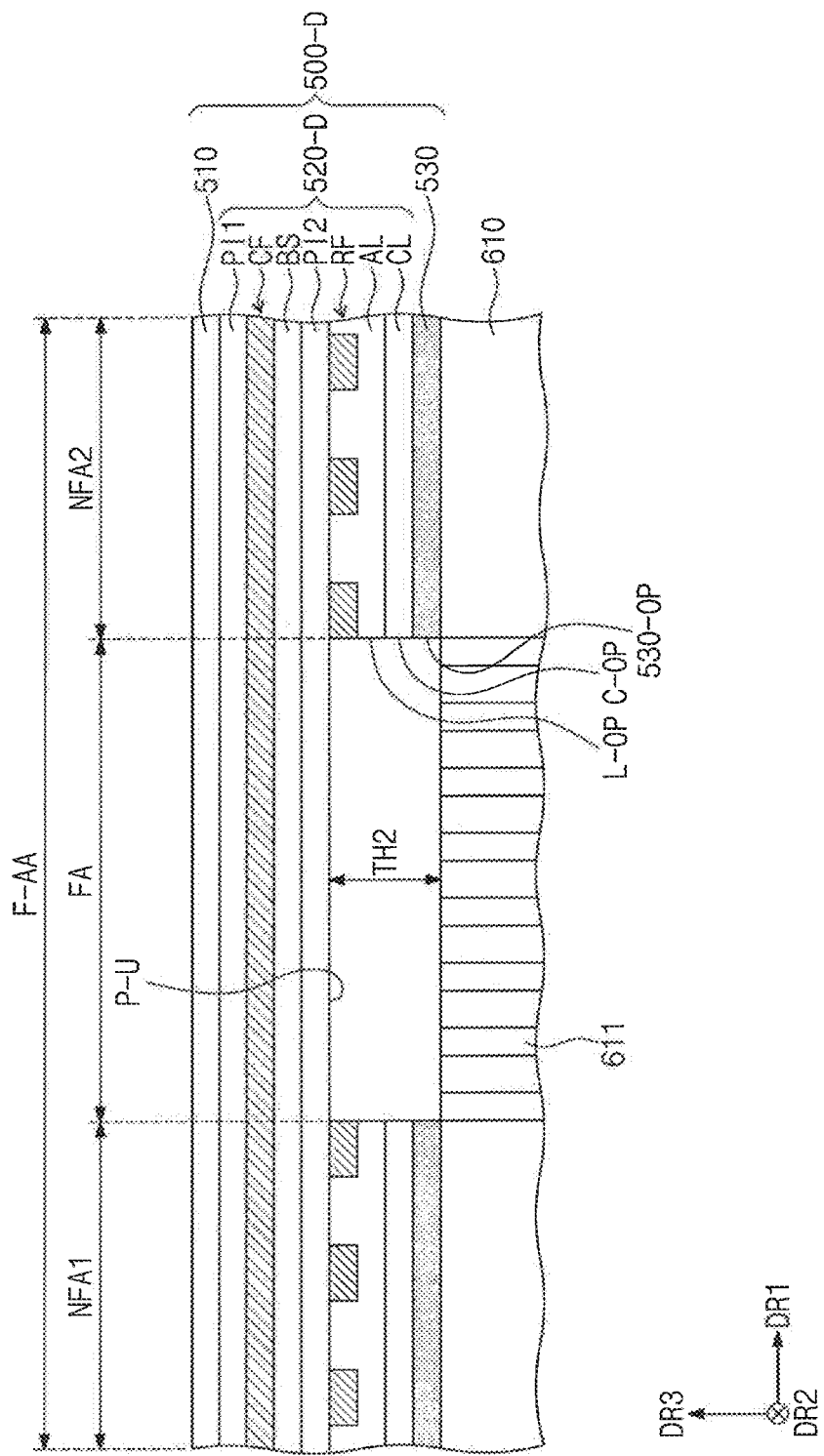
FIG. 9 is a cross-sectional view illustrating some of the elements of the electronic apparatus according to an embodiment of the inventive concept.
Figure 10:
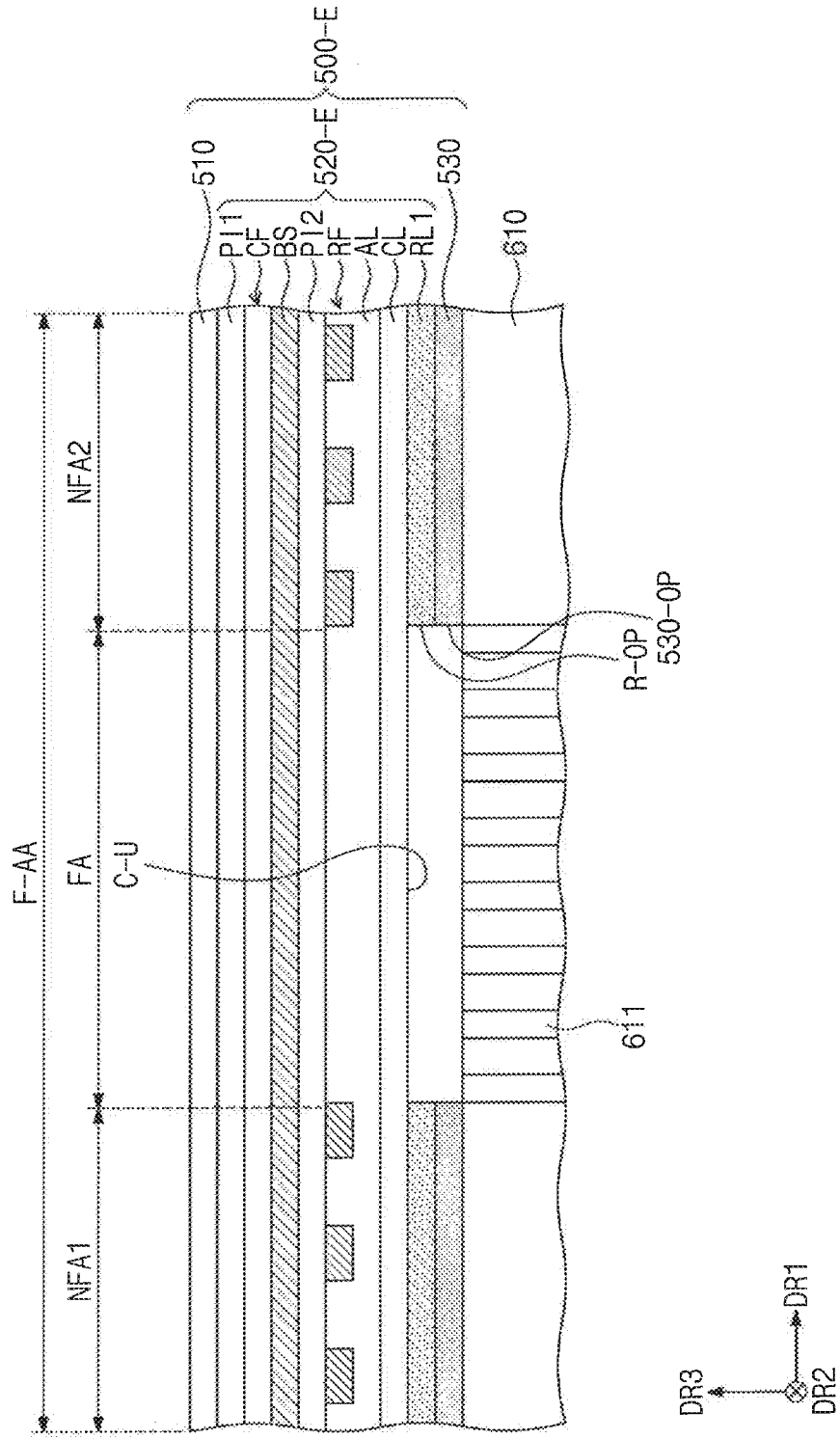
FIG. 10 is a cross-sectional view illustrating some of the elements of the electronic apparatus according to an embodiment of the inventive concept.
Figure 11:
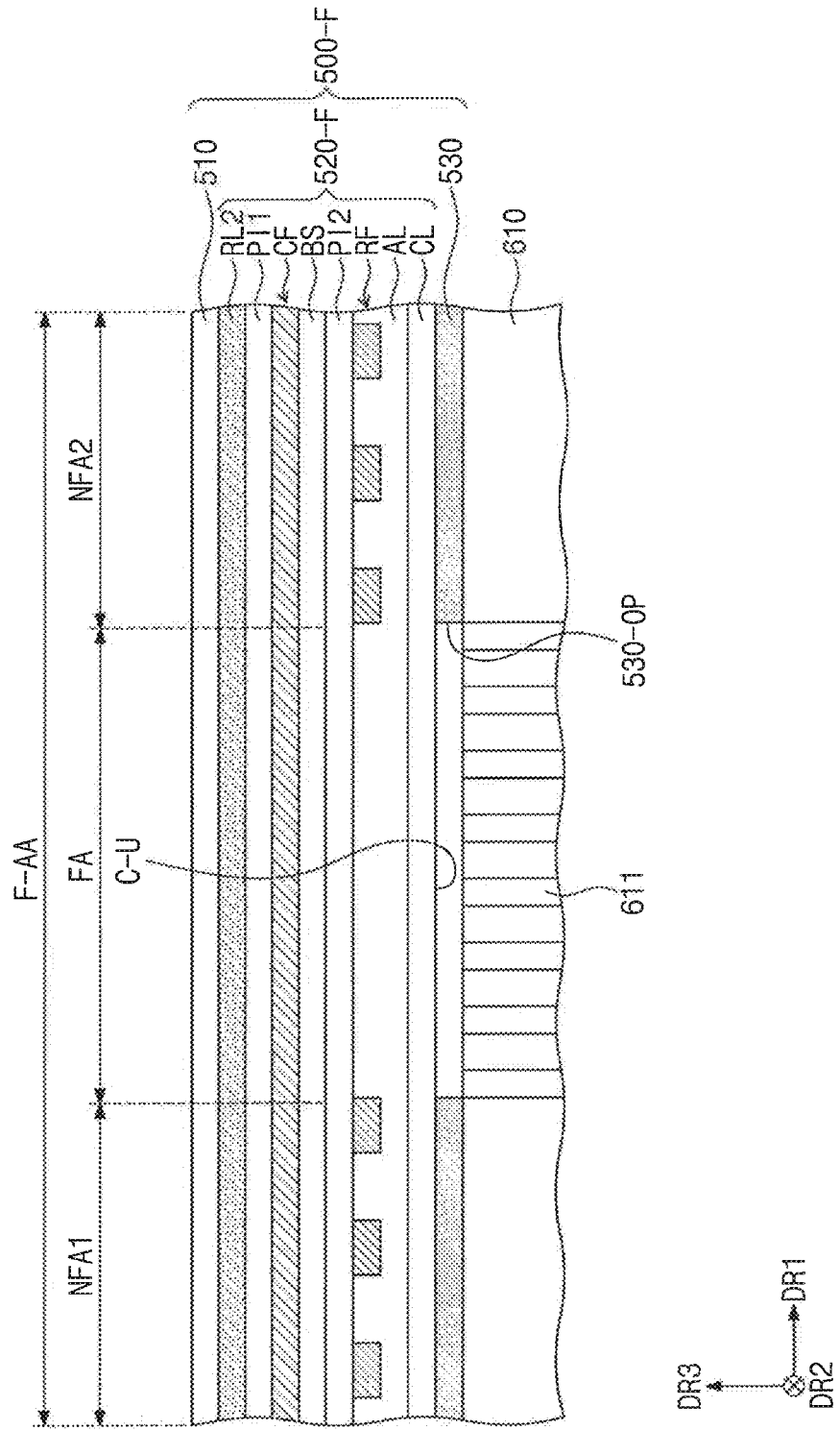
FIG. 11 is a cross-sectional view illustrating some of the elements of the electronic apparatus according to an embodiment of the inventive concept.
Figure 12:
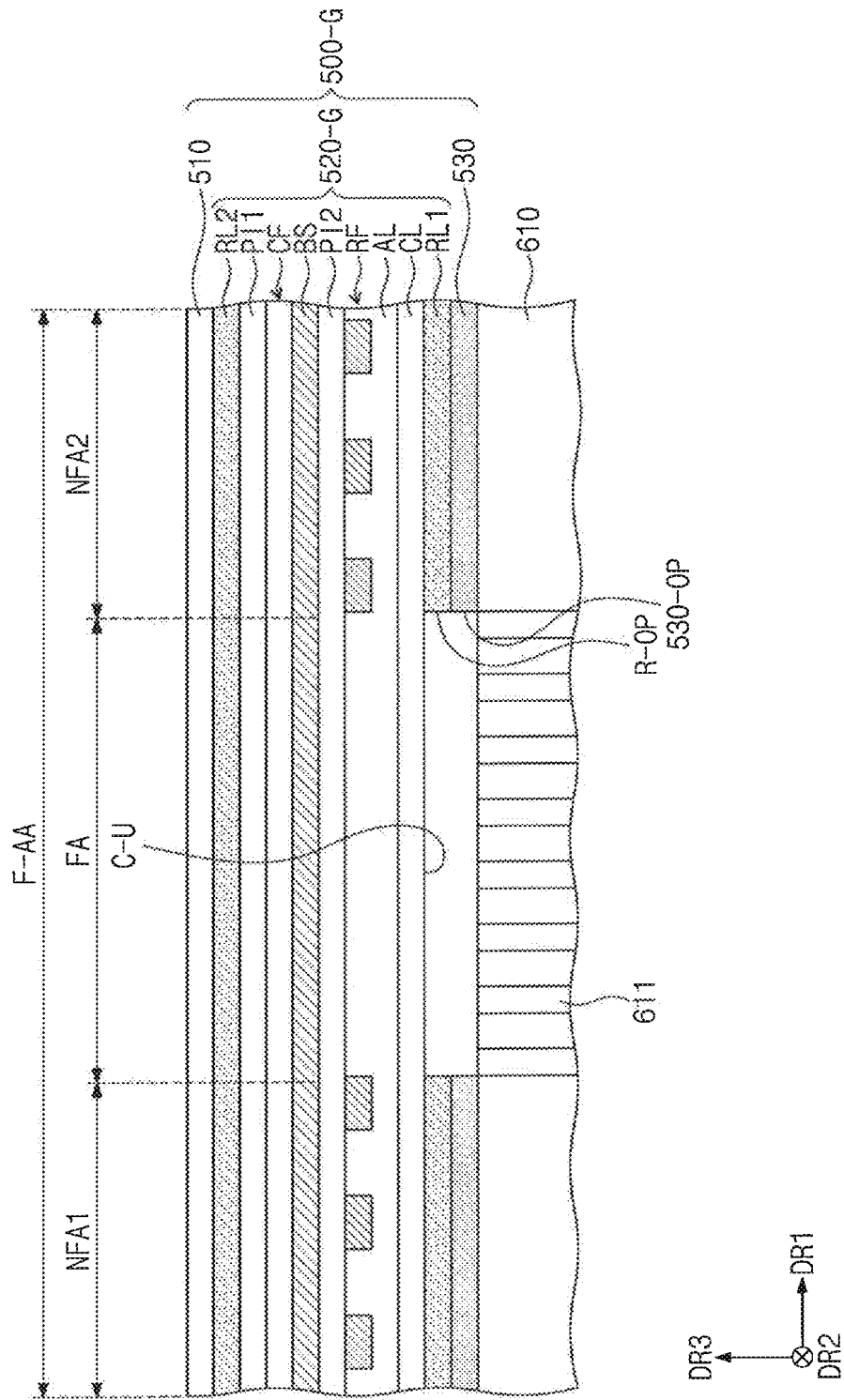
FIG. 12 is a cross-sectional view illustrating some of the elements of the electronic apparatus according to an embodiment of the inventive concept.

FIG. 6 is a cross-sectional view illustrating some elements of an electronic apparatus according to an embodiment of the inventive concept. FIG. 7 is a cross-sectional view illustrating some elements of an electronic apparatus according to an embodiment of the inventive concept. FIGS. 8A and 8B are each a cross-sectional view illustrating some elements of an electronic apparatus according to an embodiment of the inventive concept. FIG. 9 is a cross-sectional view illustrating some elements of an electronic apparatus according to an embodiment of the inventive concept. FIG. 10 is a cross-sectional view illustrating some elements of an electronic apparatus according to an embodiment of the inventive concept. FIG. 11 is a cross-sectional view illustrating some elements of an electronic apparatus according to an embodiment of the inventive concept. FIG. 12 is a cross-sectional view illustrating some elements of an electronic apparatus according to an embodiment of the inventive concept. FIGS. 6 and 12 are cross-sectional views of an area corresponding to the area of FIG. 5.

The same/similar reference numerals are used for the same components as those of FIGS. 1A and 5, and thus, their duplicated descriptions may be omitted.

Referring to FIG. 6, a sensing sensor 500-A according to an embodiment of the inventive concept may include a first sensing adhesive layer 510, a second sensing adhesive layer 530, and a digitizer 520-A disposed between the first sensing adhesive layer 510 and the second sensing adhesive layer 530.

The second sensing adhesive layer 530 may have a sensing opening 530-OP overlapping the folding area FA. The sensing opening 530-OP may overlap a plurality of lower openings 611.

In this embodiment, the protective layer CL includes a bent portion CL-C that is recessed in a direction from the second base layer PI2 to the first base layer PI1 in an area overlapping the folding area FA.

In the bent portion CL-C, the inner adhesive layer AL may be disposed on the second base layer PI2 from which the second sensing coil RF is omitted. In addition, since the protective layer CL is disposed on the inner adhesive layer AL, the bent portion may be provided by a height difference between the adjacent areas by a height of the second sensing coil RF. For example, the inner adhesive layer AL may be thinner near a center of the sensing opening 530-OP as compared to an edge of the sensing opening 530-OP.

According to an embodiment of the inventive concept, a maximum distance TH1 from the plate 610 to the bent portion CL-C may be about 50 µm.

Referring to FIG. 7, a sensing sensor 500-B according to an embodiment of the inventive concept may include a first sensing adhesive layer 510, a second sensing adhesive layer 530, and a digitizer 520-B disposed between the first sensing adhesive layer 510 and the second sensing adhesive layer 530.

The second sensing adhesive layer 530 may have a sensing opening 530-OP overlapping the folding area FA. The sensing opening 530-OP may overlap a plurality of lower openings 611.

In this embodiment, the protective layer CL may have a protective opening CL-OP overlapping the folding area FA. The protective opening CL-OP may be a side surface of the protective layer CL exposed by allowing the protective opening CL-OP to pass therethrough. The protective opening CL-OP may overlap the sensing opening 530-OP.

In this embodiment, the side surface of the protective layer CL forming the protective opening CL-OP may be aligned with the side surface of the sensing opening 530-OP forming the sensing opening 530-OP.

In this embodiment, one surface A-U of the inner adhesive layer AL overlapping the folding area FA may be exposed by the protective opening CL-OP of the protective layer CL.

In this embodiment, the second sensing coil RF may be spaced apart from the folding area FA. Accordingly, the second sensing coil RF may not overlap the folding area FA.

Referring to FIG. 8A, a sensing sensor 500-C1 according to an embodiment of the inventive concept may include a first sensing adhesive layer 510, a second sensing adhesive layer 530, and a digitizer 520-C1 disposed between the first sensing adhesive layer 510 and the second sensing adhesive layer 530.

In this embodiment, the digitizer 520-C1 may further include a plurality of dummy patterns DMP. The dummy patterns DMP may be disposed on the second base layer PI2 and covered by the inner adhesive layer AL. The dummy patterns DMP may be insulated from the second sensing coil RF in a floated state.

The dummy patterns DMP may extend in the second direction DR2 and may be spaced apart from each other in the first direction DR1. Although 8A illustrates the second sensing coils RF and the dummy patterns DMP, which are alternately disposed, the inventive concept is not limited thereto. For example, a plurality of dummy patterns DMP may be disposed between different second sensing coils.

In this embodiment, the dummy patterns DMP may be spaced apart from the folding area FA. Accordingly, the dummy patterns DMP may be overlap the non-folding areas NFA1 and NFA2.

Referring to FIG. 8B, a sensing sensor 500-C2 according to an embodiment of the inventive concept may include a first sensing adhesive layer 510, a second sensing adhesive layer 530, and a digitizer 520-C2 disposed between the first sensing adhesive layer 510 and the second sensing adhesive layer 530.

The digitizer 520-C2 according to this embodiment may include at least one additional dummy pattern DMP-C overlapping the folding area FA, unlike the digitizer 520-C1 described in FIG. 8A. The additional dummy pattern DMP-C may extend in the second direction DR2 which is the same direction as the dummy patterns DMP.

Referring to FIG. 9, the sensing sensor 500-D according to an embodiment of the inventive concept may include a first sensing adhesive layer 510, a second sensing adhesive layer 530, and a digitizer 520-D disposed between the first sensing adhesive layer 510 and the second sensing adhesive layer 530.

The second sensing adhesive layer 530 may have a sensing opening 530-OP overlapping the folding area FA. The sensing opening 530-OP may overlap a plurality of lower openings 611.

In this embodiment, the protective layer CL may have a protective opening CL-OP overlapping the folding area FA. The protective opening CL-OP may be a side surface of the protective layer CL exposed by allowing the protective opening CL-OP to pass therethrough. The protective opening CL-OP may overlap the sensing opening 530-OP.

In this embodiment, the inner adhesive layer AL may have an inner opening L-OP overlapping the folding area FA. The inner opening L-OP may be a side surface of the inner adhesive layer AL exposed by allowing the inner opening L-OP to pass therethrough. The inner opening L-OP may overlap the protective opening CL-OP.

In this embodiment, the side surface of the inner adhesive layer AL forming the inner opening L-OP may be aligned with the side surface of the sensing opening 530-OP forming the sensing opening 530-OP and the side surface of the protective layer CL forming the protective opening CL-OP.

In this embodiment, one surface P-U of the second base layer PI2 overlapping the folding area FA may be exposed by the inner opening L-OP of the inner adhesive layer AL.

In this embodiment, the second sensing coil RF may be spaced apart from the folding area FA. Accordingly, the second sensing coil RF may not overlap the folding area FA. However, a side of the second sensing coil RD may be exposed by the inner opening L-OP.

In this embodiment, a distance TH2 from the upper plate 610 to the one surface P-U of the second base layer PI2 exposed by the inner opening L-OP may be about 11 µm to about 50 µm.

Referring to FIG. 10, a sensing sensor 500-E according to an embodiment of the present embodiment may include a first sensing adhesive layer 510, a second sensing adhesive layer 530, and a digitizer 520-E disposed between the first sensing adhesive layer 510 and the second sensing adhesive layer 530. In this embodiment, the digitizer 520-E may further include a first cover layer RL1.

In this embodiment, the first cover layer RL1 may be disposed between the protective layer CL and the second sensing adhesive layer 530. The first cover layer RL1 may include resin. The first cover layer RL1 may be disposed below the sensing coils CF and RF to reduce stress applied to the sensing coils CF and RF during the folding of the electronic apparatus EA.

The second sensing adhesive layer 530 may have a sensing opening 530-OP overlapping the folding area FA. The sensing opening 530-OP may overlap a plurality of lower openings 611.

The first cover layer RL1 may have a cover opening R-OP overlapping the folding area FA. The cover opening R-OP may be a side surface of the first cover layer RL1 exposed by allowing the cover opening R-OP to pass therethrough. The cover opening R-OP may overlap the sensing opening 530-OP.

In this embodiment, one surface C-U of the protective layer CL overlapping the folding area FA on the protective layer CL may be exposed from the cover opening R-OP of the cover layer CL.

In this embodiment, the second sensing coil RF may be spaced apart from the folding area FA. Accordingly, the second sensing coil RF may not overlap the folding area FA.

Referring to FIG. 11, the sensing sensor 500-F according to an embodiment of the inventive concept may include a first sensing adhesive layer 510, a second sensing adhesive layer 530, and a digitizer 520-F disposed between the first sensing adhesive layer 510 and the second sensing adhesive layer 530. In this embodiment, the digitizer 520-F may further include a second cover layer RL2.

In this embodiment, the second cover layer RL2 may be disposed between the first base layer PI1 and the first sensing adhesive layer 510. The second cover layer RL2 may include resin.

The second sensing adhesive layer 530 may have a sensing opening 530-OP overlapping the folding area FA. The sensing opening 530-OP may overlap a plurality of lower openings 611.

In this embodiment, the second sensing coil RF may be spaced apart from the folding area FA. Accordingly, the second sensing coil RF may not overlap the folding area FA.

Referring to FIG. 12, the sensing sensor 500-G according to an embodiment of the inventive concept may include a first sensing adhesive layer 510, a second sensing adhesive layer 530, and a digitizer 520-G disposed between the first sensing adhesive layer 510 and the second sensing adhesive layer 530. In this embodiment, the digitizer 520-G may further include a first cover layer RL1 and a second cover layer RL2.

The first cover layer RL1 may be disposed between the protective layer CL and the second sensing adhesive layer 530. The first cover layer RL1 may include resin. The second cover layer RL2 may be disposed between the first base layer PI1 and the first sensing adhesive layer 510. Each of the first cover layer RL1 and the second cover layer RL2 may include resin.

The second sensing adhesive layer 530 may have a sensing opening 530-OP overlapping the folding area FA. The sensing opening 530-OP may overlap a plurality of lower openings 611.

The first cover layer RL1 may have a cover opening R-OP overlapping the folding area FA. The cover opening R-OP may be a side surface of the first cover layer RL1 exposed by allowing the cover-opening R-OP to pass therethrough. The cover opening R-OP may overlap the sensing opening 530-OP.

In this embodiment one surface C-U of the protective layer CL overlapping the folding area is may be exposed from the cover opening R-OP of the first cover layer RL1.

In this embodiment, the second sensing coil RF may be spaced apart from the folding area FA. Accordingly, the second sensing coil RF may not overlap the folding area FA.

Figure 13:
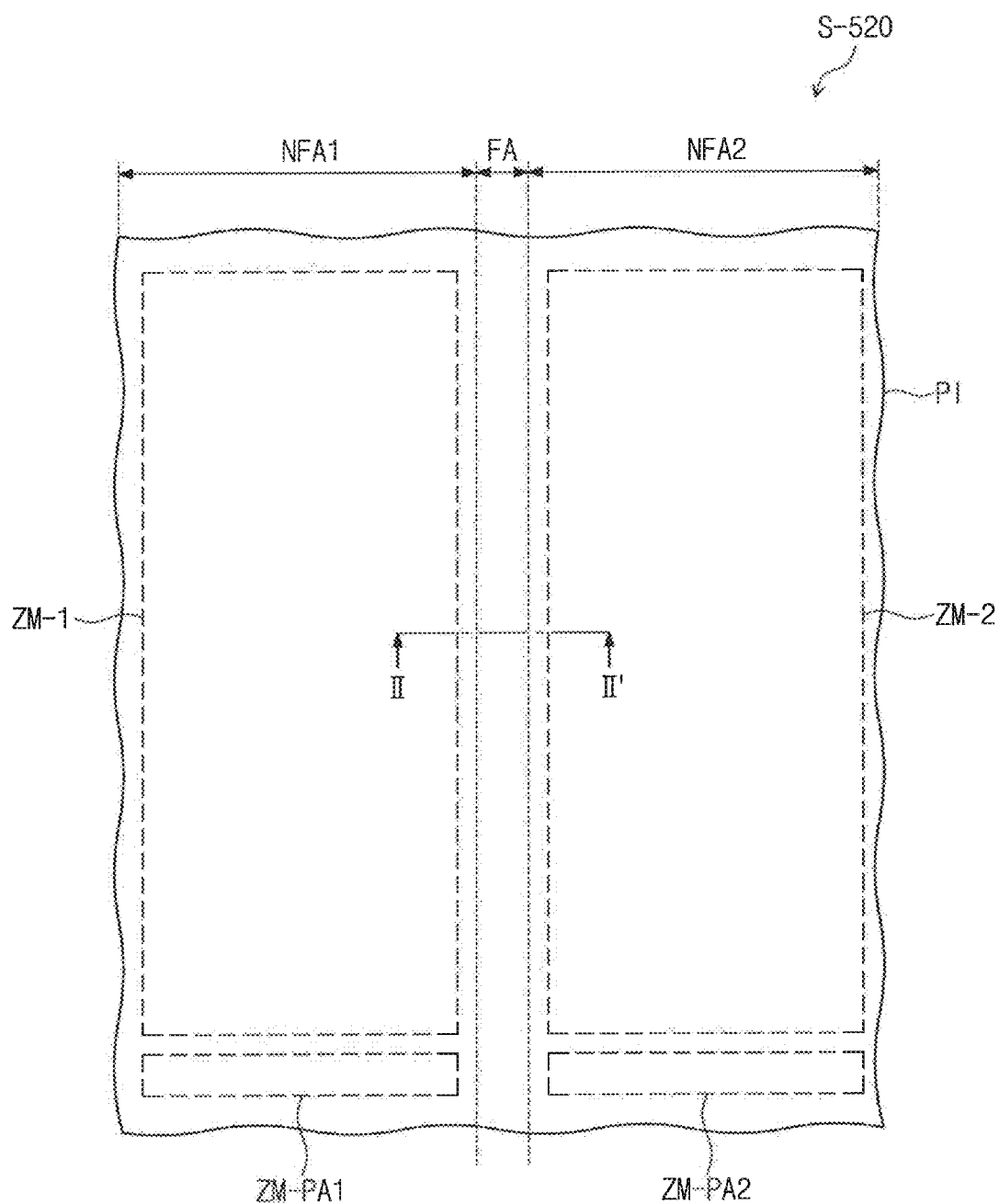
FIG. 13 is a plan view of a sensing sensor according to an embodiment of the inventive concept.
Figure 14:
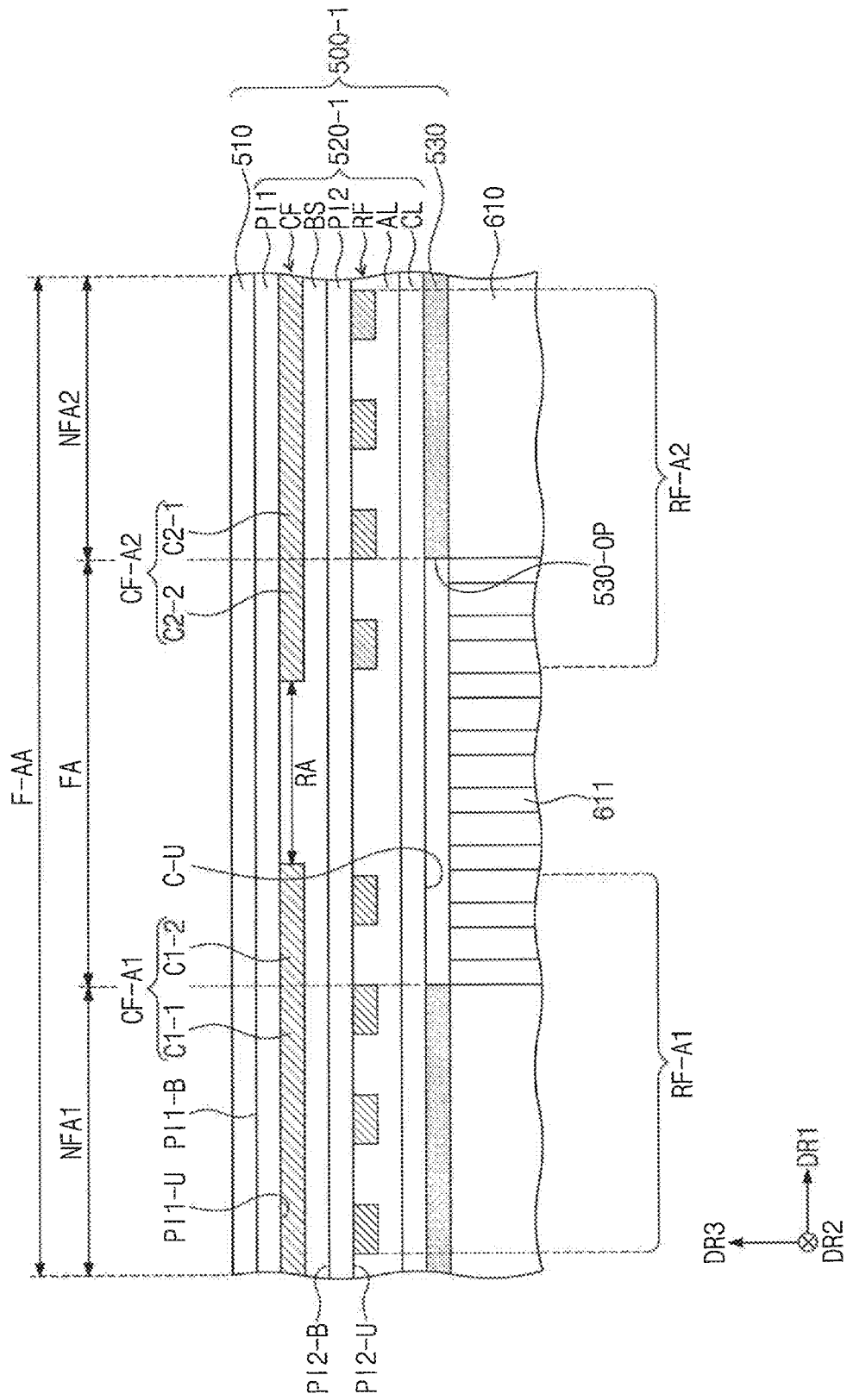
FIG. 14 is a cross-sectional view taken along line II-II' of FIG. 13.
Figure 15A:
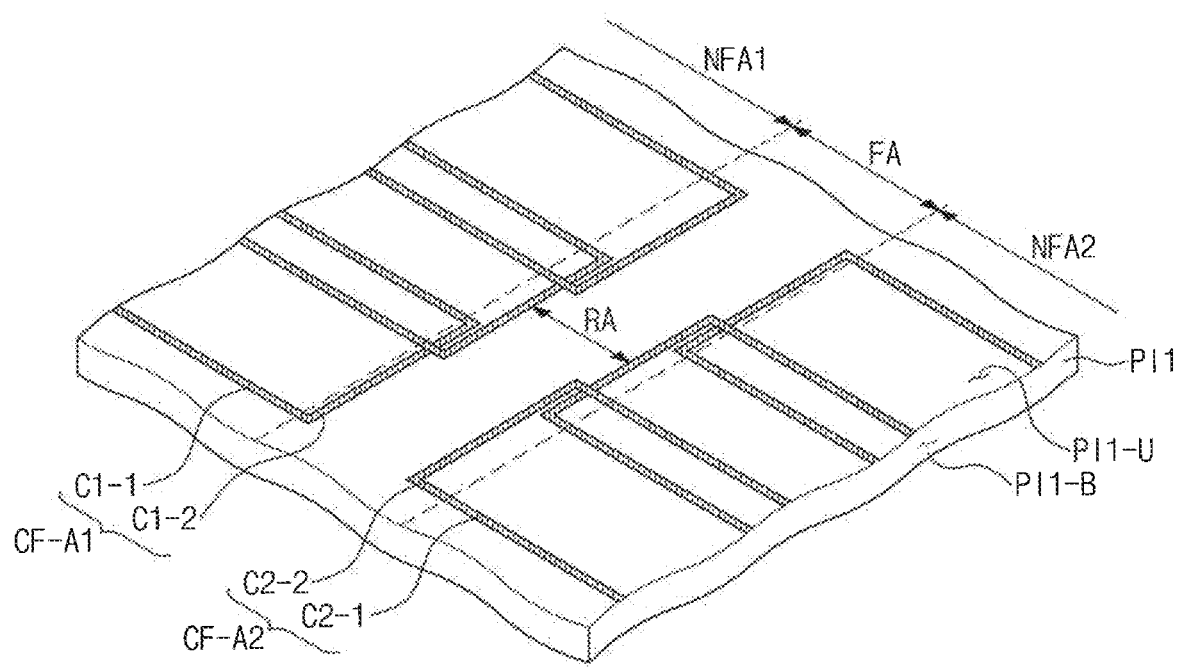
FIG. 15A is an exploded perspective view of a digitizer according to an embodiment of the inventive concept.
Figure 15A:
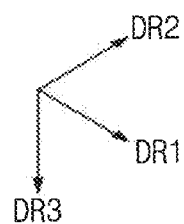
Figure 15B:
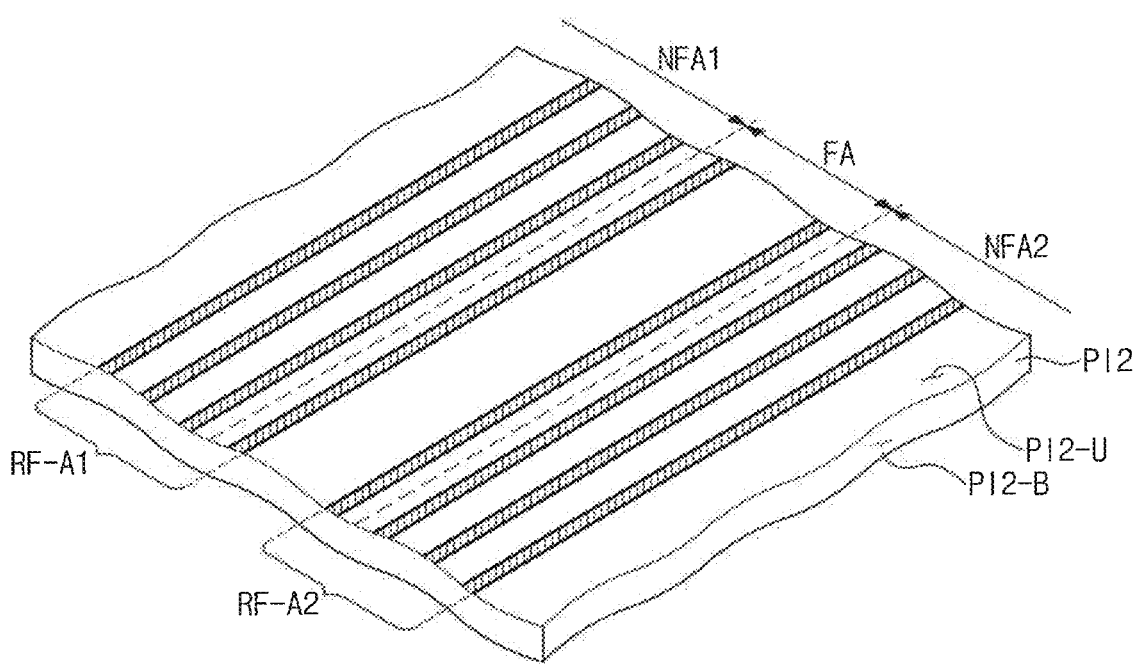
FIG. 15B is an exploded perspective view of a digitizer according to an embodiment of the inventive concept.
Figure 15B:
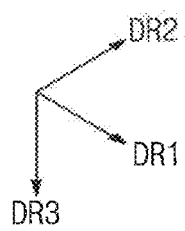

FIG. 13 is a plan view of a sensing sensor according to an embodiment of the inventive concept. FIG. 14 is a cross-sectional view taken along line II-II' of FIG. 13; and each of FIGS. 15A and 15B is an exploded perspective view of a digitizer according to an embodiment of the inventive concept. The same/similar reference numerals are used for the same components as those of FIGS. 1A and 12, and thus, their duplicated descriptions may be omitted.

FIG. 13 is a schematic plan view of a digitizer S-520 according to an embodiment of the inventive concept. In the present embodiment, the digitizer S-520, unlike the digitizer 520 described in FIG. 4, may include a plurality of sensing parts ZM-1 and ZM-2 for sensing different external inputs and a plurality of sensing pad parts ZM-PA1 and ZM-PA2.

The first sensing part ZM-1 may be spaced apart from the folding area FA and may be disposed on the base layer PI to overlap the first non-folding area NFA1. The first sensing pan ZM-1 may include digitizer sensors CF1, CF2, and RF2 included in the single sensing part ZM described in FIG. 4. Accordingly, the first sensing part ZM-1 may include the plurality of first sensing coils CF1-1, CF1-2, CF1-3, CF2-1, CF2-2, and CF2-3 and the second sensing coils RF-1, RF1-2, RF1-3, RF2-1, RF2-2, and RF2-3, which are described in FIG. 4.

The first sensing part ZM-1 may calculate 2D coordinate information of an input point that is separated from the input point by the pen SP, which is input to the second sensing part ZM-2.

The first sensing pad part ZM-PA1 may include first digitizer pads TC1 connected to the plurality of first sensing coils CF1-1, CF1-2, CF1-3, CF2-1, CF2-2, and CF2-3, which are described in FIG. 4, and second digitizer pads TC2 connected to second sensing coils RF1-1, RF1-2, RF1-3, RF2-1, RF2-2, and RF2-3, which are described in FIG. 4.

The second sensing part ZM-2 may be spaced apart from the folding area FA and may be disposed on the base layer PI to overlap the second non-folding area NFA2. The second sensing part ZM-2 may include digitizer sensors CF1, CF2, RF1, and RF2 included in the single sensing part ZM described in FIG. 4. Accordingly, the second sensing part ZM-2 may include the plurality of first sensing coils CF1-1, CF1-2, CF1-3, CF2-1, CF2-2, and CF2-3 and the second sensing coils RF1-1, RF1-2, RF1-3, RF2-1, RF2-2, and RF2-3, which are described in FIG. 4.

The second sensing part ZM-2 may calculate 2D coordinate information of an input point that is separated from the input point by the pen SP, which is input to the first sensing part ZM-1.

The second sensing pad part ZM-PA2 may include first digitizer pads TC1 connected to the plurality of first sensing coils CF1-1, CF1-2, CF1-3, CF2-1, CF2-2, and CF2-3, which are described in FIG. 4, and second digitizer pads TC2 connected to second sensing coils RF1-1, RF1-2, RF2-1, RF2-2, and RF2-3, which are described in FIG. 4.

In this embodiment, although the first sensing pad part ZM-PA1 and the second sensing pad part ZM-PA2 are illustrated to be disposed below the first and second sensing parts ZM-1 and ZM-2, respectively, the inventive concept is not limited thereto. For example, the positions of the first sensing pad part ZM-PA1 and the second sensing pad part ZM-PA2 are not limited to a specific embodiment as long as they are spaced apart from the folding area FA.

The digitizer S-520 according to this embodiment may include the first sensing part ZM-1 and the second sensing part ZM-2, which are separately driven. Thus, in an out-folding state, the user may sense an external input by the pen SP (see FIG. 1A) on the used area, and the remaining areas may be power-saved to enable the electronic apparatus EA to have an increased use time.

In addition, as the digitizer S-520 according to this embodiment includes the first sensing part ZM-1 and the second sensing part ZM-2, which are spaced apart from each other with the folding area FA therebetween, the stress applied to the sensing coils of the digitizer S-520 may not be affected during the folding. Accordingly, the electronic apparatus EA having improved folding characteristics may be provided.

Referring to FIGS. 14 to 15B, the sensing sensor 500-1 according to an embodiment of the inventive concept may include a first sensing adhesive layer 510, a second sensing adhesive layer 530, and a digitizer 520-1 disposed between the first sensing adhesive layer 510 and the second sensing adhesive layer 530.

The digitizer 520-1 may include a first base layer PI1 in contact with the first sensing adhesive layer 510, a bonding sheet BS disposed on the first base layer PI1, a second base layer PI2 disposed on the bonding sheet BS, an inner adhesive layer AL disposed on the second base layer PI2, and a protective layer CL disposed on the inner adhesive layer AL and in contact with the second sensing adhesive layer 530.

The first base layer PI1 may include a first surface PI1-B in contact with the first sensing adhesive layer 510 and a second surface PI1-U facing the first surface PI1-B.

The second base layer PI2 may include a first surface PI2-B in contact with the bonding sheet BS and a second surface PI2-U facing the first surface PI2-B.

The digitizer 520-1 may include a first-1 sensing coil RF-A1 and a first-2 sensing coil CF-A2, which are disposed on the second surface PI1-U of the first base layer PI1 and covered by the bonding sheet BS.

The digitizer 520-1 may include a second-1 sensing coil RF-A1 and a second-2 sensing coil RF-A2, which are disposed on the second surface PI2-U of the second base layer PI2 and covered by the inner adhesive layer Al.

The first-1 sensing coil CF-A1 may be one of the first sensing coils CFI-1, CFI-2, CF1-3, CF2-1, CF2-2, and CF2-3 included in the first sensing part ZM-1 described above in FIG. 13.

The first-2 sensing coil CF-A2 may be one of the first sensing coils CF1-1, CF1-2, CF1-3, CF2-1, CF2-2, and CF2-3 included in the second sensing part ZM-2 described above in FIG. 13.

The second-1 sensing coil RF-A1 may be one of the second sensing coils RF1-1, RF1-2, RF1-3, RF2-1, RF2-2, and RF2-3 included in the first sensing part ZM-1.

The second-2 sensing coil RF-A2 may be one of the second sensing coils RF1-1, RF1-2, RF1-3, RF2-1, RF2-2, and RF2-3 included in the second sensing part ZM-2.

In the second sensing adhesive layer 530 according to an embodiment of the inventive concept, a sensing opening 530-OP overlapping the folding area FA may be provided. The sensing openings 530-OP may overlap a plurality of lower openings 611.

The sensing opening 530-OP may be a side surface of the second sensing adhesive layer 530 that is exposed by allowing the second sensing opening 530-OP to pass therethrough. In this embodiment, one surface C-U of the protective layer CL overlapping the folding area FA may be exposed by the sensing opening 530-OP of the second sensing adhesive layer 530.

In this embodiment, the first-1 sensing coil CF-A1 may include a first coil C1-1 overlapping the first non-folding area NFA1 and a second coil C1-2 extending from the first coil C1-1 to overlap the folding area FA.

The first coil C1-1 may extend in the first direction DR1. A portion of the second coil C1-2 may extend in the first direction DR1, and the other portion of the second coil C1-2 may extend in the second direction DR2.

The first-2 sense coil CF-A2 may include a first coil C2-1 overlapping the second non-folding area NFA2 and a second coil C2-2 extending froth the first coil C2-1 to overlap the folding area FA.

The first coil C2-1 may extend in the first direction DR1. A portion of the second coil C2-2 may extend in the first direction DR1, and the other portion of the second coil C2-2 may extend in the second direction DR2.

According to this embodiment, a spaced distance RA between the second coil C1-2 2 and the second coil C2-2, which are adjacent to and within the folding area FA, may be about 1.5 mm or more. When the spaced distance RA is less than about 1.5 mm, during the folding, stress may be applied to the second coil C1-2 and the second coil C2-2 overlapping the folding area FA to cause cracks.

In this embodiment, at least one of the second-1 sensing coil RF-A1 and the second-2 sensing coil RF-A2 may overlap the folding area FA. Even if at least one of the second-1 sensing coil RF-A1 and the second-2 sensing coil RF-A2 is disposed on the folding area FA, since the second-1 sensing coil RF-A1 and the second-2 sensing coil RF-A2 extend in the second direction DR2 which is the same direction as the virtual folding axis AX1 (see FIG. 1B), the second-1 sensing coil RF-A1 and the second-2 sensing coil RF-A2 may be less affected by the stress applied during the folding when compared to the first-1 sensing coil CF-A1 and the first-2 sensing coil CF-A2.

Figure 16:
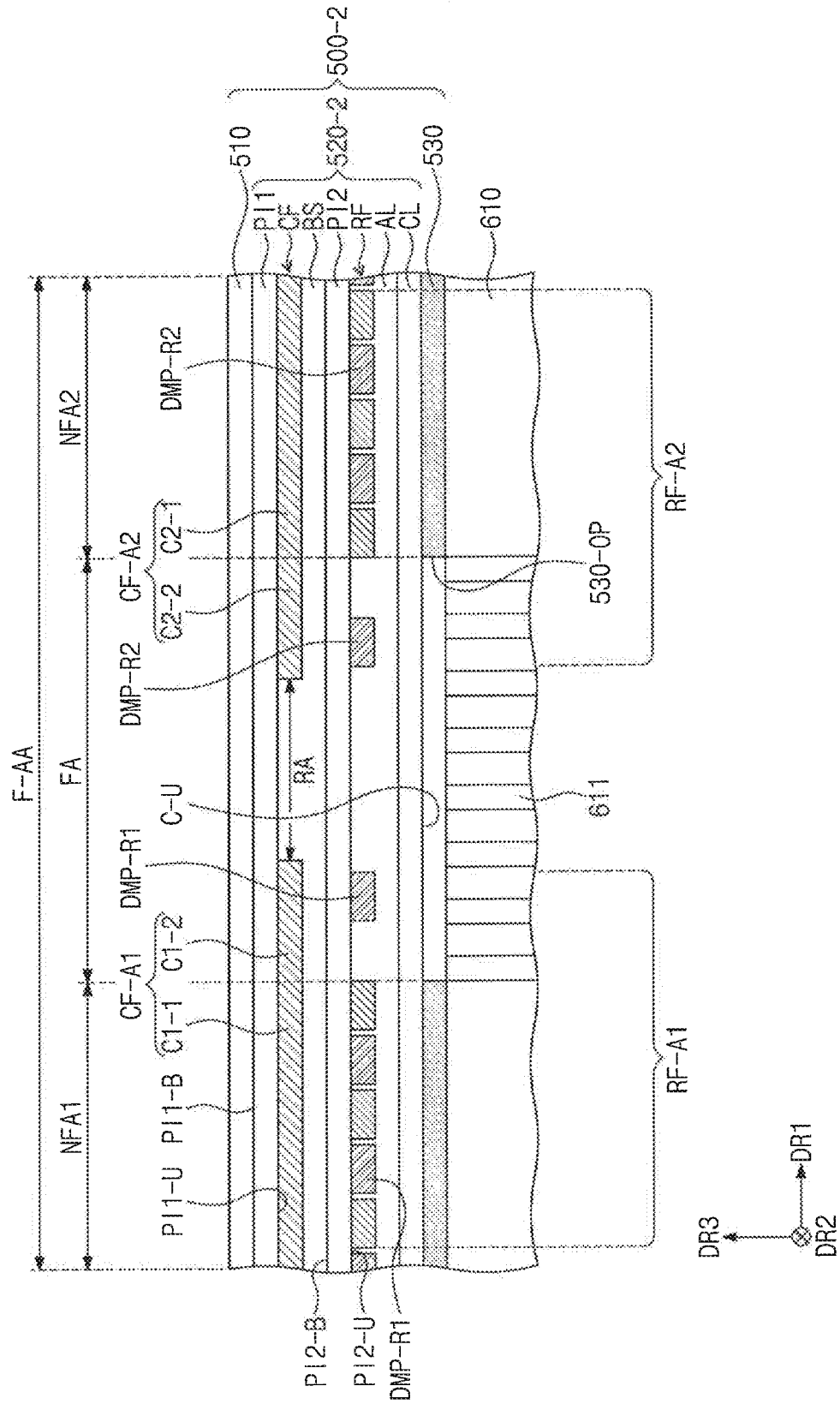
FIG. 16 is a cross-sectional view illustrating some elements of at electronic apparatus according to an embodiment of the inventive concept.
Figure 17A:
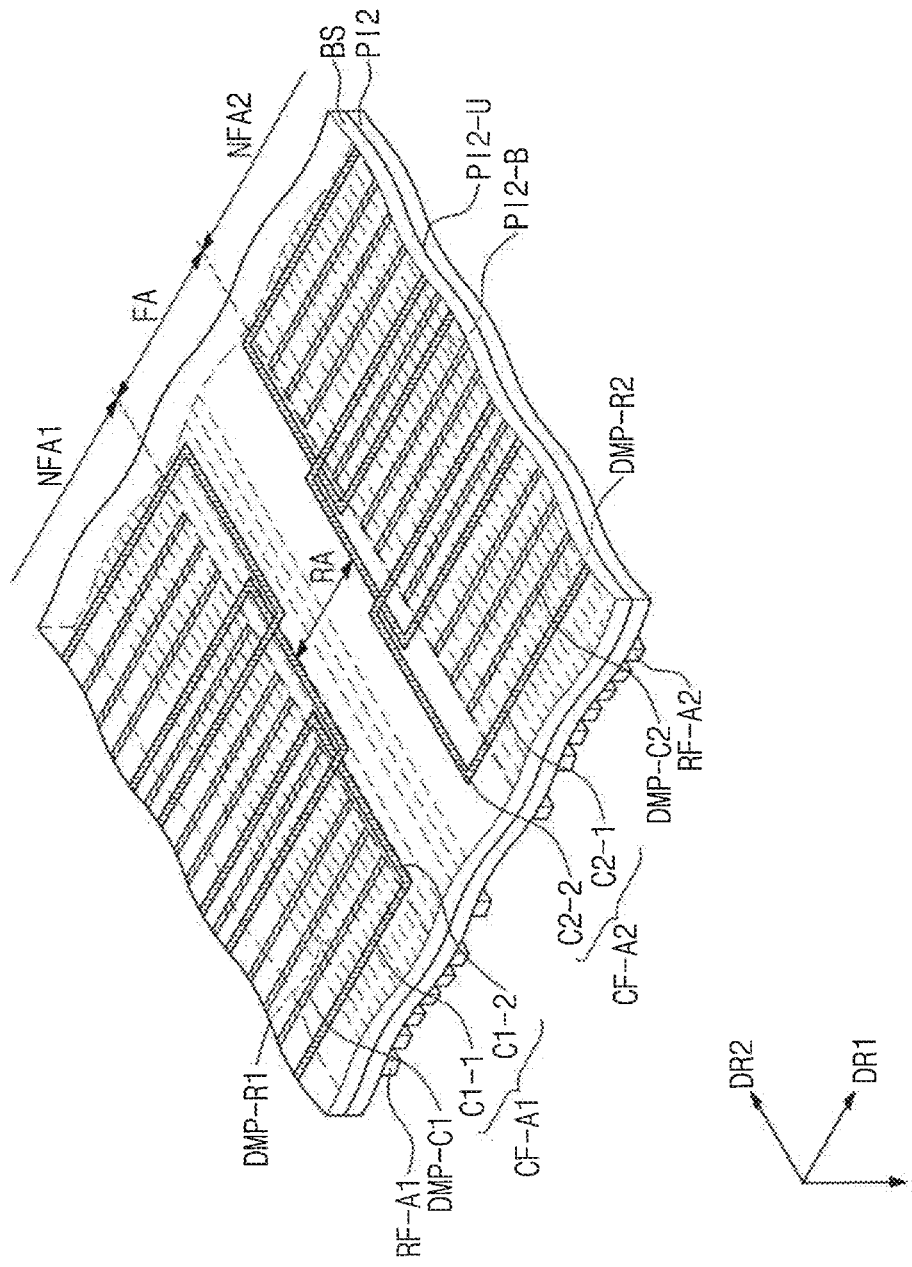
FIG. 17A is a coupling perspective view of a digitizer according to an embodiment of the inventive concept.
Figure 17B:
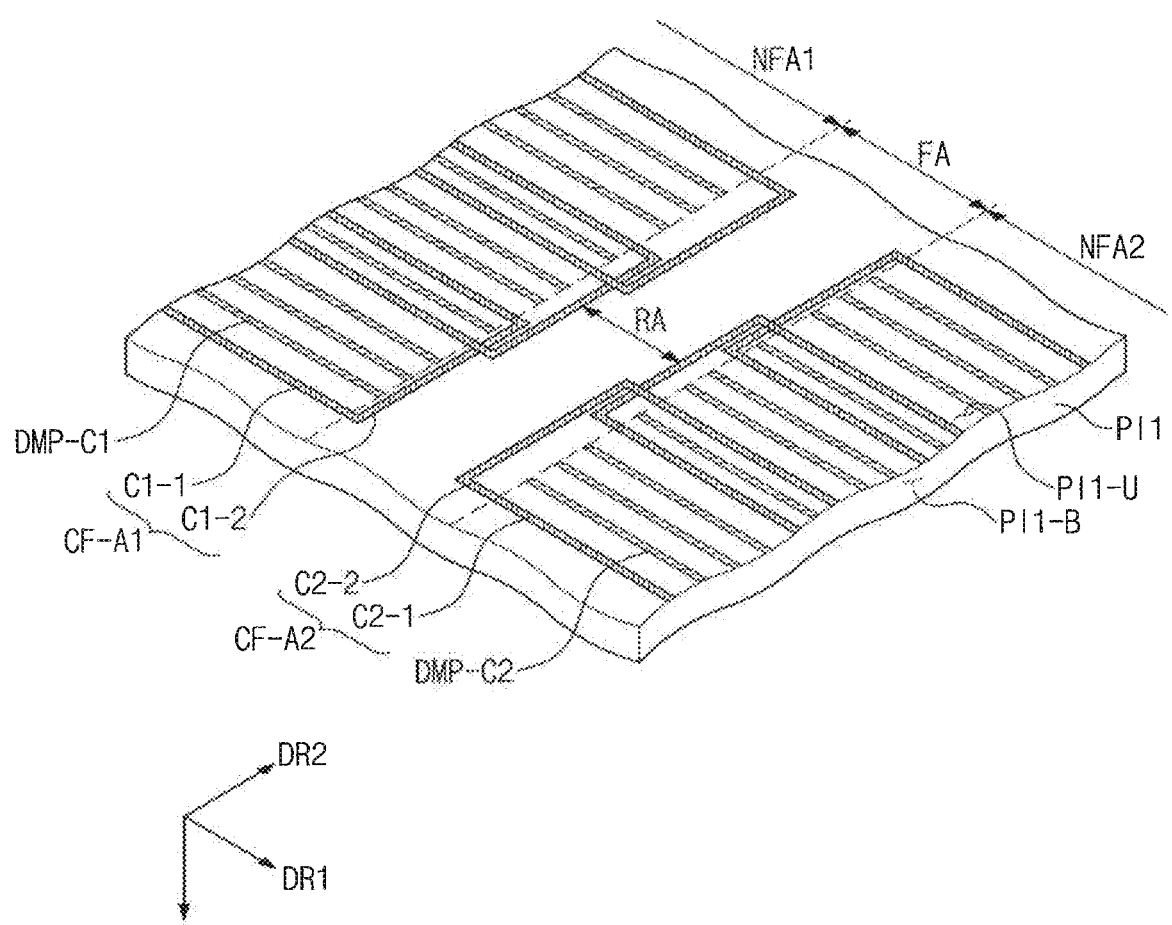
FIG. 17B is an exploded perspective view of the digitizer according to an embodiment of the inventive concept.
Figure 17C:
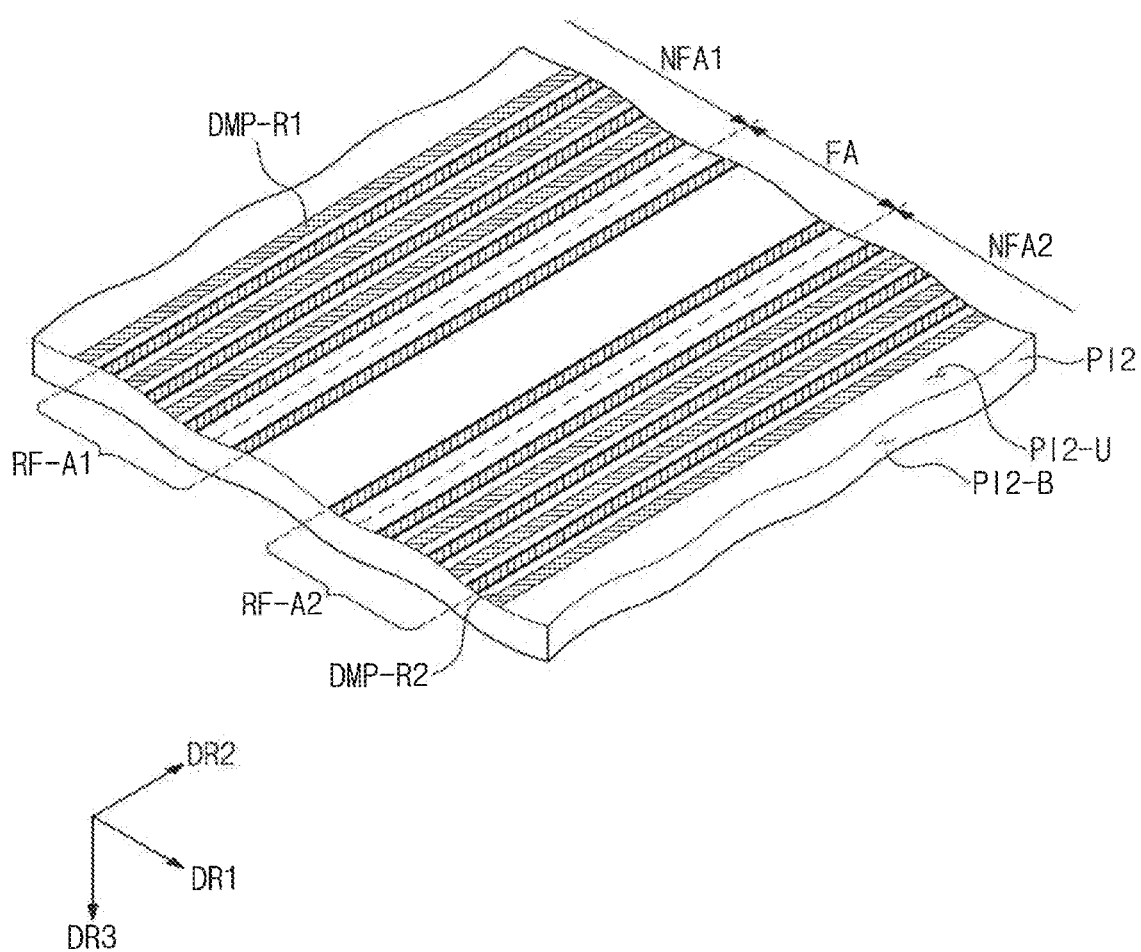
FIG. 17C is an exploded perspective view of the digitizer according to an embodiment of the inventive concept.

FIG. 16 is a cross-sectional view illustrating some elements of an electronic apparatus according to an embodiment of the inventive concept. FIG. 17A is a coupling perspective view of a digitizer according to an embodiment of the inventive concept. FIG. 17B is an exploded perspective view of the digitizer according to an embodiment of the inventive concept. FIG. 17C is an exploded perspective view of the digitizer according to an embodiment of the inventive concept. The same similar reference numerals are used for the same components as those of FIGS. 13 to 15B, and thus, their duplicated descriptions may be omitted. In the coupling perspective view of FIG. 17A, for convenience of explanation, only lines disposed on the bonding sheet BS and lines disposed on the second base layer PI2 are illustrated. Referring to FIGS. 16 to 17C, the sensing sensor 500-2 according to an embodiment of the present embodiment may include a first sensing adhesive layer 510, a second sensing adhesive layer 530, and a digitizer 520-2 disposed between the first sensing adhesive layer 510 and the second sensing adhesive layer 530.

The digitizer 520-2 may include a first base layer PI1 in contact with the first sensing adhesive layer 510, a bonding sheet BS disposed on the first base layer PI1, a second base layer PI2 disposed on the bonding sheet BS, an inner adhesive layer AL disposed on the second base layer PI2, and a protective layer CL disposed on the inner adhesive layer AL and in contact with the second sensing adhesive layer 530.

The digitizer 520-2 may include a first-1 sensing coil CF-A1 and a first-2 sensing coil CF-A2, which are disposed on the second surface PI1-U of the first base layer PI1 and covered by the bonding sheet BS.

The digitizer 520-2 may include a second-1 sensing coil RF-A1 and a second-2 sensing coil FF-A2, which are disposed on the second surface PI2-U of the second base layer PI2 and covered by the inner adhesive layer AL.

The first-1 sensing coil CF-A1 may be one of the first sensing coils CF1-1, CT1-2, CF1-3, CF2-1, CF2-2, and CF2-3 included in the first sensing part ZM-1 described above in FIG. 13.

The first-2 sensing coil CF-A2 may be one of the first sensing coils CF1-1, CF1-2, CF1-3, CT2-1, CF2-2, and CF2-3 included in the second sensing part ZM-2 described above in FIG. 13.

The second-1 sensing coil RF-A1 may be one of the second sensing coils RF1-1, RF1-2, RF1-3, RF2-1, RF2-2, and RF2-3 included in the first sensing part ZM-1.

The second-2 sensing coil RF-A2 may be one of the second sensing coils RF1-1, RF1-2, RF1-3, RF2-1, RF2-2, and RF2-3 included in the second sensing part ZM-2.

In this embodiment, the digitizer 520-2 may include a plurality of dummy patterns DMP-C1, DMP-C2, DMP-R1, and DMP-R2.

The first dummy patterns DMP-C1 and DMP-C2 may be disposed on the same layer as the first-1 sensing coil CF-A1 and the first-2 sensing coil CF-A2.

The first-1 dummy patterns DMP-C1 may overlap the first non-folding area NFA1. The first-1 dummy patterns DMP-C1 may extend in the first direction DR1 and may be arranged to be spaced apart from each other in the second direction DR2. In this embodiment, the first-1 dummy patterns DMP-C1 may be spaced apart, from the folding area FA. Accordingly, the first-1 dummy patterns DMP-C1 may not overlap the folding area FA.

The first-2 dummy patterns DMP-C2 may overlap the second non-folding area NFA2. The first-2 dummy patterns DMP-C2 may extend in the first direction DR1 and may be arranged to be spaced apart from each other in the second direction DR2. In this embodiment, the first-2 dummy patterns DMP-C2 may be spaced apart from the folding area FA. Accordingly, the first-2 dummy patterns DMP-C2 may be spaced apart from the first-1 dummy patterns DMP-C1 with the folding area PA therebetween.

According to this embodiment, a spaced distance RA between the second coil C1-2 and the second coil C2-2, which are adjacent to the folding area PA, may be about 1.5 mm or more. When the spaced distance RA is less than about 1.5 mm, during the folding, stress may be applied to the second coil C1-2 and the second coil C2-2 overlapping the folding area FA to cause cracks.

The digitizer 520-2 may include a second-1 sensing coil RF-A1 and a second-2 sensing coil RF-A2, which are disposed on the second surface PI2-U of the second base layer PI2 and covered by the inner adhesive layer AL.

The second dummy patterns DMP-R1 and DMP-R2 may be disposed on the same layer as the second-1 sensing coil RF-A1 and the second-2 sensing coil RP-A2.

The second-1 dummy patterns DMP-R1 may overlap the first non-folding area NFA1. The second-1 dummy patterns DMP-R1 may extend in the second direction DR2 and may be spaced apart from each other along the first direction DR1. In this embodiment, the second-1 dummy patterns DMP-R1 may be spaced apart from the folding area FA. Accordingly, the second-1 dummy patterns DMP-R1 may not overlap the folding area FA.

The second-2 dummy patterns DMP-R2 may overlap the second non-folding area NFA2. The second-2 dummy patterns DMP-R2 may extend in the second direction DR2 and may be spaced apart from each other along the first direction DR1. In this embodiment, the second-2 dummy patterns DMP-R2 may be spaced apart from the folding area FA. Accordingly, the second-2 dummy patterns DMP-R2 may be spaced apart from the second-1 dummy patterns DMP-R1 with the folding area FA therebetween. Since the dummy patterns DMP-C1, DMP-C2, DMP-R1, and DMP-R2 are disposed between the sensing coils spaced apart from each other, a phenomenon in which the sensing coils are visually recognized by the user may be prevented. Furthermore, since the dummy patterns DMP-C1, DMP-C2, DMP-R1, and DMP-R2 are disposed to not overlap the folding area FA, the dummy patterns DMP-C1, DMP-C2, DMP-R1, and DMP-R2 may not affect the digitizer 520-2 during the folding.

Figure 18:
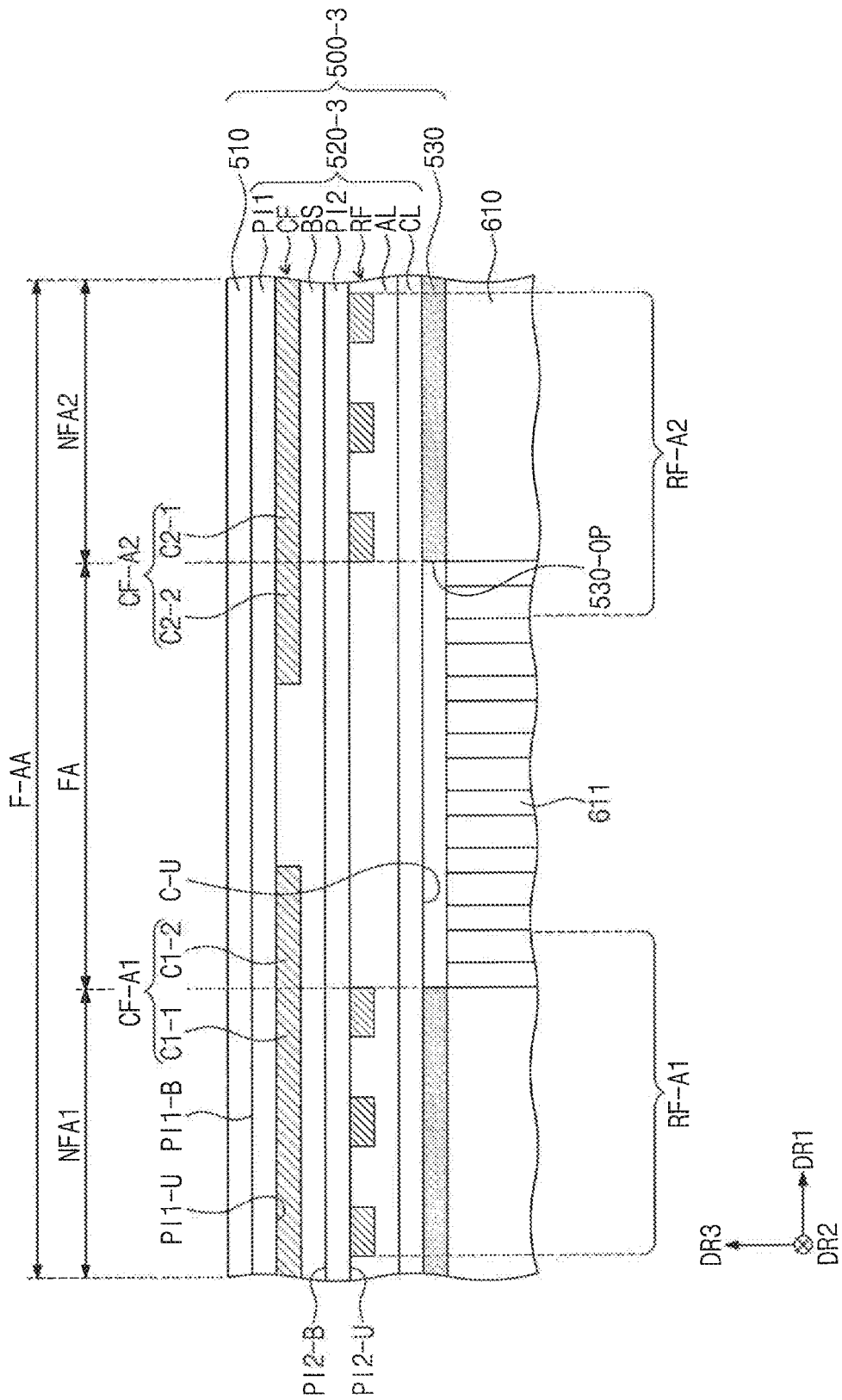
FIG. 18 is a cross-sectional view illustrating some elements of an electronic apparatus according to an embodiment of the inventive concept.
Figure 19A:
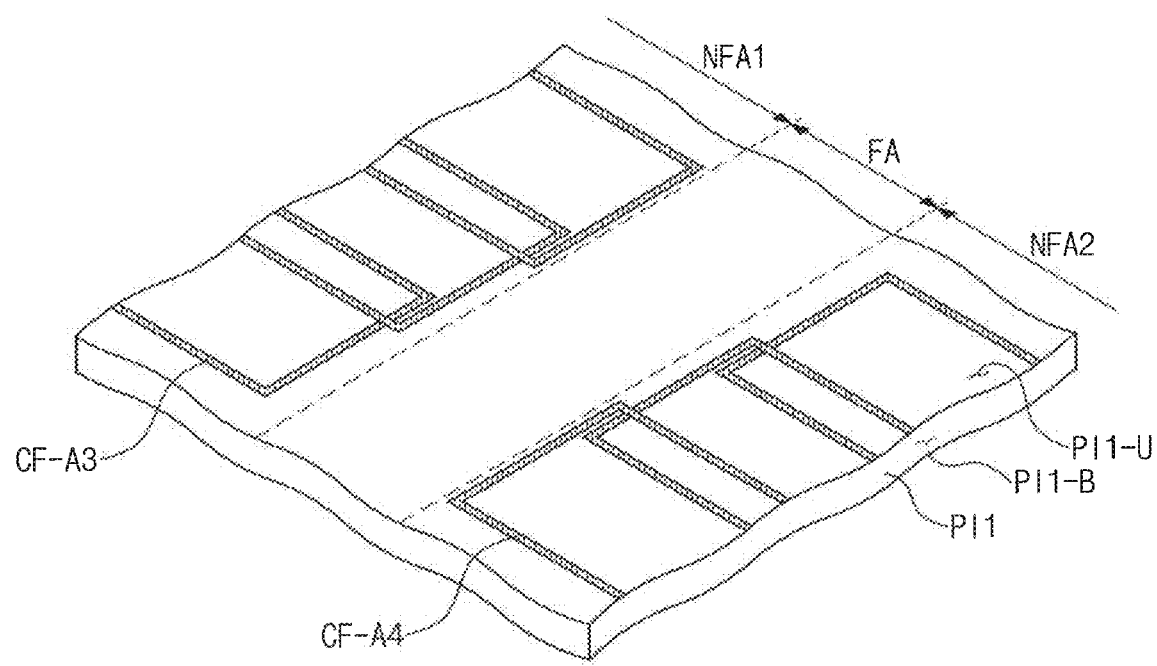
FIG. 19A is an exploded perspective view of a digitizer according to an embodiment of the inventive concept.
Figure 19A:
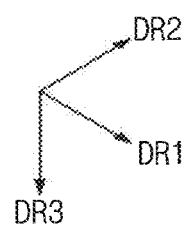
Figure 19B:
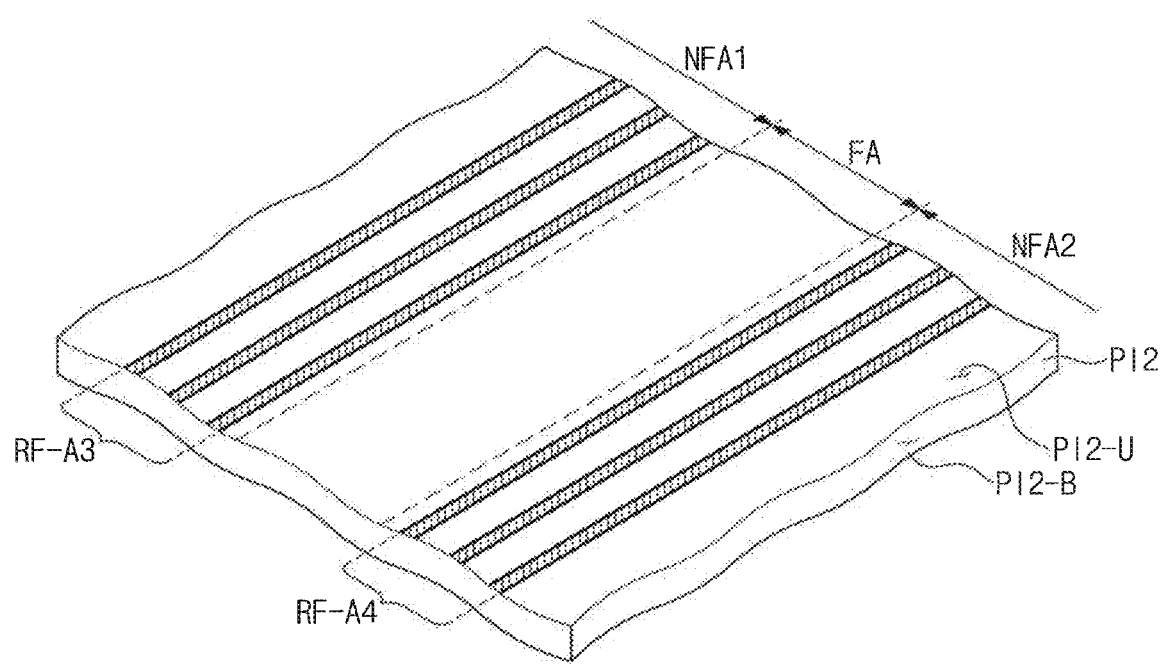
FIG. 19B is an exploded perspective view of the digitizer according to an embodiment of the inventive concept.
Figure 19B:
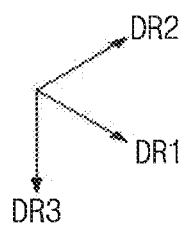

FIG. 18 is a cross-sectional view illustrating elements of an electronic apparatus according to an embodiment of the inventive concept. FIG. 19A is an exploded perspective view of a digitizer according to an embodiment of the inventive concept. FIG. 19B is an exploded perspective view of the digitizer according to an embodiment of the inventive concept. The same/similar reference numerals are used for the same components as those of FIGS. 13 to 15B, and thus, their duplicated descriptions may be omitted.

Referring to FIGS. 18 to 19B, the sensing sensor 500-3 according to an embodiment of the inventive concept may include a first sensing adhesive layer 510, a second sensing adhesive layer 530, and a digitizer 520-3 disposed between the first sensing adhesive layer 510 and the second sensing adhesive layer 530.

The digitizer 520-3 may include a first base layer PI1 in contact with the first sensing adhesive layer 510, a bonding sheet BS disposed on the first base layer PI1, a second base layer PI2 disposed on the bonding sheet BS, an inner adhesive layer AL disposed on the second base layer PI2, and a protective layer CL disposed on the inner adhesive layer AL and in contact with the second sensing adhesive layer 530.

The first base layer PI1 may include a first surface PI1-B in contact with the first sensing adhesive layer 510 and a second surface PI1-U facing the first surface PI1-B.

The second base layer PI2 may include a first surface PI2-B in contact with the bonding sheet BS and a second surface PI2-U facing the first surface PI2-B.

The digitizer 520-3 may include a first-1 sensing coil CF-A3 and a first-2 sensing coil CF-A4, which are disposed on the second surface PI1-U of the first base layer PI1 and covered by the bonding sheet BS.

In this embodiment, the first-1 sensing coil CF-A3 and the first-2 sensing coil CF-A4 may be spaced apart from the folding area FA. Accordingly, the first-1 sensing coil CF-A3 and the first-2 sensing coil CF-A4 may not overlap the folding area FA.

The digitizer 520-3 may include a second-1 sensing coil RF-A3 and a second-2 sensing coil FF-A4, which are disposed on the second surface PI2-U of the second base layer PI2 and covered by the inner adhesive layer Al.

In this embodiment, the second-1 sensing coil RF-A3 and the second-2 sensing coil RF-A4 may be spaced apart from the folding area FA. Accordingly, the second-1 sensing coil RF-A3 and the second-2 sensing coil RF-A4 may not overlap the folding area FA.

In the second sensing adhesive layer 530 according to an embodiment of the inventive concept, a sensing opening 530-OP overlapping the folding area FA may be provided. The sensing opening 530-OP may overlap a plurality of lower openings 611.

The sensing opening 530-OP may be a side surface of the second sensing adhesive layer 530 that is exposed by allowing the second sensing opening 530-OP to pass therethrough. In this embodiment, one surface C-U of the protective layer CL overlapping the folding area FA may be exposed by the sensing opening 530-OP of the second sensing adhesive layer 530.

FIG. 20 is a cross-sectional view of a sensing sensor according to an embodiment of the inventive concept. FIG. 21 is a cross-sectional view of a sensing sensor according to an embodiment of the inventive concept. The same/similar reference numerals are used for the same components as those of FIGS. 1 to 19B, and thus, their duplicated descriptions may be omitted.

Referring to FIG. 20, a sensing sensor 500-*a* may include a first sensing adhesive layer 510, a second sensing adhesive layer 530, a shielding layer 540, and a digitizer 520-*a*.

In this embodiment, the digitizer 520-*a* may include a first sensing coil CF, a base layer PI, and a second sensing coil RF.

In this embodiment, the first sensing coil CF and the second sensing coil RF may be embedded in the base layer PI. In the inventive concept, the term "embedded" may mean that a constituent "b" is disposed inside a constituent "a" without distinct layers.

The first sensing coil CF may be disposed relatively adjacent to the display panel 100 compared to the second sensing coil RF, and the second sensing coil RF may be disposed relatively adjacent to the shielding layer 540 compared to the first sensing coil CF. The first sensing coil CF and the second sensing coil RF may be insulated from each other in the base layer PI and may be spaced apart from each other.

The shielding layer 540 may be disposed below the second sensing adhesive layer 530. The shielding layer 540 may prevent electrical interference between the components, which are disposed below the digitizer 520-*a*, and the digitizer 520-*a*.

The shielding layer 540 may include a magnetic metal powder (MMP). However, the material of the shielding layer 540 is not limited thereto and may include one of permalloy, which is an alloy of nickel (Ni) and iron (Fe), invar, and stainless steel. Thus, the electronic apparatus EA having increased visibility may be provided.

Referring to FIG. 21, a sensing sensor 500-*b* may include a first sensing adhesive layer 510, a second sensing adhesive layer 530, a shielding layer 540, and a digitizer 520-*b*.

In this embodiment, the digitizer 520-*b* may include a first cover layer PI1, a first sensing coil CF, a second cover layer PI2, a second sensing coil RF, an inner adhesive layer AL, and a protective layer CL.

In this embodiment, the first sensing coil CF is directly disposed on the first cover layer PI1. The second cover layer PI2 covers the first sensing coil CF. The second sensing coil RF is directly disposed on the second cover layer PI2.

The inner adhesive layer AL is disposed between the protective layer CL and the second cover layer PI2 to couple the protective layer CL the second cover layer PI2. The inner adhesive layer AL may be an optically clear adhesive film (OCA), a resin (OCR), or a pressure sensitive adhesive film (PSA). In addition, the inner adhesive layer AL may include a photocurable adhesive material or a thermosetting adhesive material, but is not limited thereto.

The protective layer CL may be disposed on the second cover layer PI2 to reduce the stress applied to the digitizer 520-*b* during folding. The protective layer CL may include an organic material.

According to an embodiment of the inventive concept, as the second sensing adhesive layer that couples the digitizer to the lower plate includes the sensing opening overlapping the folding area, when the electronic apparatus is folded, the shape of the sensing sensor overlapping the folding area may be more easily deformed.

As a result, the stress applied to the sensing coils overlapping the folding area among the plurality of sensing coils included in the digitizer may be reduced to prevent the sensing coils from being cracked. Therefore, the electronic apparatus having the increased reliability may be provided.

Embodiments of the inventive concept provide an electronic apparatus including a sensing sensor that is capable of being easily deformed in shape during folding.

Although the inventive concept has been described with reference to embodiments of the inventive concept, it will be apparent to those skilled in the art that various change and modifications can be made by those skilled in the art without departing from the spirit and scope of the inventive concept.

What is claimed is:

1. An electronic apparatus, comprising:
   a display panel, which comprises first and second non-folding areas arranged in a first direction and a folding area disposed between the first and second non-folding areas, wherein the display panel is folded along a folding axis extending in a second direction crossing the first direction, the display panel further comprising a plurality of pixels;
   a lower member which is disposed below the display panel; and
   a sensor comprising a first adhesive layer adjacent to the display panel, a second adhesive layer adjacent to the lower member, and a digitizer disposed between the first adhesive layer and the second adhesive layer and comprising a plurality of coils,
   wherein the first adhesive layer contacts an upper surface of the digitizer and the second adhesive layer contacts a lower surface of the digitizer and the lower member,
   wherein the lower member overlapping the folding area comprises a plurality of lower openings spaced apart from each other and through which the lower member passes, and
   the second adhesive layer has a sensing opening that overlaps the plurality of lower openings, and
   a portion of the digitizer overlapping the folding area includes an area where coils are not disposed.

2. The electronic apparatus of claim 1, wherein the digitizer comprises:
   a first base layer in contact with the first adhesive layer;
   a bonding sheet disposed on the first base layer;
   a second base layer disposed on the bonding sheet;
   an inner adhesive layer disposed on the second base layer; and
   a protective layer disposed on the inner adhesive layer and in contact with the second adhesive layer,
   wherein the plurality of coils comprise:
   first sensing coils disposed between the first base layer and the bonding sheet; and
   second sensing coils disposed between the second base layer and the inner adhesive layer,
   wherein at least a portion of the second sensing coils does not overlap the folding area.

3. The electronic apparatus of claim 2, further comprising dummy patterns extending in the same direction as the second sensing coils and insulated from the second sensing coils on the second base layer,
   wherein at least a portion of the dummy patterns does not overlap the folding area.

4. The electronic apparatus of claim 2, wherein the protective layer comprises a bent portion overlapping the folding area.

5. The electronic apparatus of claim 2, wherein the protective layer overlaps the sensing opening, and
   the protective layer has a protective opening through which the inner adhesive layer, which overlaps the folding area, is exposed.

6. The electronic apparatus of claim 5, wherein the inner adhesive layer overlaps the protective opening, and the inner adhesive layer has an inner opening through which the second base layer, which overlaps the folding area, is exposed.

7. The electronic apparatus of claim 2, further comprising:
a first cover layer, wherein the second adhesive layer is disposed between the first cover layer and the lower member; and
a second cover layer disposed between the first adhesive layer and the first base layer,
wherein the first cover layer has a cover opening through which the lower opening is exposed.

8. An electronic apparatus, comprising:
a display panel, which comprises first and second non-folding areas arranged in a first direction and a folding area disposed between the first and second non-folding areas, wherein the display panel is folded along a folding axis extending in a second direction crossing the first direction, the display panel further comprising a plurality of pixels;
a lower member which is disposed below the display panel, wherein the lower member includes a lower opening overlapping the folding area; and
a sensor comprising a first adhesive layer disposed between the display panel and the lower member and adjacent to the display panel, a second adhesive layer in contact with the lower member, and a digitizer disposed between the first adhesive layer and the second adhesive layer and comprising first sensing coils and second sensing coils, which are insulated from each other,
wherein at least a portion of the first sensing coils crosses the folding area, and
at least a portion of the second sensing coils does not overlap the folding area.

9. The electronic apparatus of claim 8, wherein the first sensing coils comprise first long sides extending in the first direction and spaced apart from each other in the second direction and a first short side extending in the second direction and disposed between ends of the first long sides, and
the second sensing coils comprise second long sides extending in the second direction and spaced apart from each other in the first direction and a second short side extending in the first direction and disposed between ends of the second long sides,
wherein a portion of the first long sides overlaps the folding area.

10. The electronic apparatus of claim 9, wherein a distance between two of the second long sides facing each other with the folding area therebetween is about 1.5 mm or more.

11. The electronic apparatus of claim 8, wherein the second adhesive layer has a sensing opening overlapping the folding area.

12. The electronic apparatus of claim 8, further comprising a dummy pattern disposed between the first sensing coils or between the second sensing coils, wherein the dummy pattern does not overlap the folding area.

13. An electronic apparatus, comprising:
a display panel having a folding area disposed between first and second non-folding areas;
a lower member having a first opening corresponding to the folding area; and
a sensor disposed between the display panel and the lower member, the sensor having a first adhesive layer adjacent to the display panel, a second adhesive layer adjacent to the lower member and a digitizer between the first adhesive layer and the second adhesive layer,
wherein the first adhesive layer contacts an upper surface of the digitizer and the second adhesive layer contacts a lower surface of the digitizer and the lower member, and
the second adhesive layer has a second opening corresponding the first opening,
wherein the digitizer comprises:
a first base layer in contact with the first adhesive layer;
a bonding sheet disposed on the first base layer;
a second base layer disposed on the bonding sheet; and
an inner adhesive layer disposed on the second base layer,
wherein the plurality of coils comprise:
first sensing coils disposed between the first base layer and the bonding sheet; and
second sensing coils disposed between the second base layer and the inner adhesive layer,
wherein at least a portion of the second sensing coils does not overlap the folding area.

14. The electronic apparatus of claim 13, wherein the digitizer includes first sensing coils extended lengthwise in first direction and second sensing coils extended lengthwise in a second direction crossing the first direction, wherein lengthwise portions of the second sensing coils do not overlap the folding area and lengthwise portions of the first sensing coils overlap the folding area.

15. The electronic apparatus of claim 13, further comprising a protective layer in contact with the second adhesive layer, the protective layer having a third opening corresponding to the first opening.

16. The electronic apparatus of claim 15, further comprising an inner adhesive layer in contact with the protective layer, the inner adhesive layer having a fourth opening corresponding to the first opening.

17. The electronic apparatus of claim 13, wherein the digitizer includes first sensing coils intersecting second sensing coils, wherein some of the second sensing coils do not overlap the folding area.

* * * * *